United States Patent
Itoh et al.

(10) Patent No.: US 10,021,405 B2
(45) Date of Patent: Jul. 10, 2018

(54) ENCODING DEVICE, DECODING DEVICE, AND IMAGE PROCESSING DEVICE

(71) Applicant: Kabushiki Kaisha Toshiba, Minatu-ku (JP)

(72) Inventors: Takayuki Itoh, Kawasaki (JP); Takashi Watanabe, Yokohama (JP); Atsushi Matsumura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/227,276

(22) Filed: Aug. 3, 2016

(65) Prior Publication Data

US 2017/0054990 A1    Feb. 23, 2017

(30) Foreign Application Priority Data

Aug. 18, 2015  (JP) .................................. 2015-161235

(51) Int. Cl.
| | |
|---|---|
| G06K 9/36 | (2006.01) |
| H04N 19/186 | (2014.01) |
| H04N 19/182 | (2014.01) |
| H04N 19/147 | (2014.01) |
| H04N 19/13 | (2014.01) |
| H04N 19/593 | (2014.01) |

(52) U.S. Cl.
CPC ........... *H04N 19/186* (2014.11); *H04N 19/13* (2014.11); *H04N 19/147* (2014.11); *H04N 19/182* (2014.11); *H04N 19/593* (2014.11)

(58) Field of Classification Search
USPC ....................................................... 382/233
See application file for complete search history.

(56) References Cited

U.S. PATENT DOCUMENTS

| | | | | |
|---|---|---|---|---|
| 5,764,804 A | * | 6/1998 | Yajima | ................... G06T 9/004 348/27 |
| 5,963,672 A | | 10/1999 | Yajima et al. | |
| 6,519,365 B2 | | 2/2003 | Kondo et al. | |

(Continued)

FOREIGN PATENT DOCUMENTS

| | | |
|---|---|---|
| JP | 7-177357 A | 7/1995 |
| JP | 10-164619 A | 6/1998 |

(Continued)

*Primary Examiner* — Jerome Grant, II
(74) *Attorney, Agent, or Firm* — Oblon, McClelland, Maier & Neustadt, L.L.P.

(57) ABSTRACT

According to an embodiment, an encoding device includes a determination unit, a first palette generator, a first assignment unit, an encoder, and a first reference generator. The determination unit is configured to determine an additional palette that holds a color not included in a reference palette among colors included in a predetermined operation unit of an input image. The first palette generator is configured to generate a palette for encoding including a color included in the additional palette and a color included in the reference palette. The first assignment unit is configured to assign, to each pixel in the operation unit, an index indicating a color in the palette for encoding corresponding to a color of the pixel. The encoder is configured to encode the index and information on the additional palette. The first reference generator is configured to generate the reference palette from the palette for encoding.

9 Claims, 11 Drawing Sheets

(56) References Cited

U.S. PATENT DOCUMENTS

| | | |
|---|---|---|
| 9,183,643 B2 | 11/2015 | Matsumura et al. |
| 2001/0012398 A1* | 8/2001 | Todoroki ............ H04N 19/593 |
| | | 382/166 |
| 2014/0241630 A1 | 8/2014 | MacInnis et al. |
| 2015/0023416 A1 | 1/2015 | Tanaka et al. |
| 2015/0341656 A1* | 11/2015 | Seregin ............... H04N 19/105 |
| | | 375/240.12 |
| 2015/0341673 A1* | 11/2015 | Joshi .................... H04N 19/70 |
| | | 375/240.12 |
| 2016/0227239 A1* | 8/2016 | Pu ....................... H04N 19/593 |
| 2016/0234498 A1* | 8/2016 | Misra ................... H04N 19/46 |
| 2016/0316199 A1* | 10/2016 | Chuang ............... H04N 19/176 |
| 2017/0105002 A1* | 4/2017 | Chuang ............... H04N 19/157 |
| 2017/0127077 A1* | 5/2017 | Chuang ............... H04N 19/46 |
| 2017/0150153 A1* | 5/2017 | Barroux .............. H04N 19/147 |
| 2017/0264909 A1* | 9/2017 | Koyama ............... H04N 19/48 |

FOREIGN PATENT DOCUMENTS

| | | | |
|---|---|---|---|
| JP | 11-272843 | A | 10/1999 |
| JP | 3740376 | B2 | 11/2005 |
| JP | 4757172 | B2 | 6/2011 |
| JP | 2014-53654 | A | 3/2014 |
| JP | 2014-107742 | A | 6/2014 |
| JP | 2015-23506 | A | 2/2015 |

\* cited by examiner

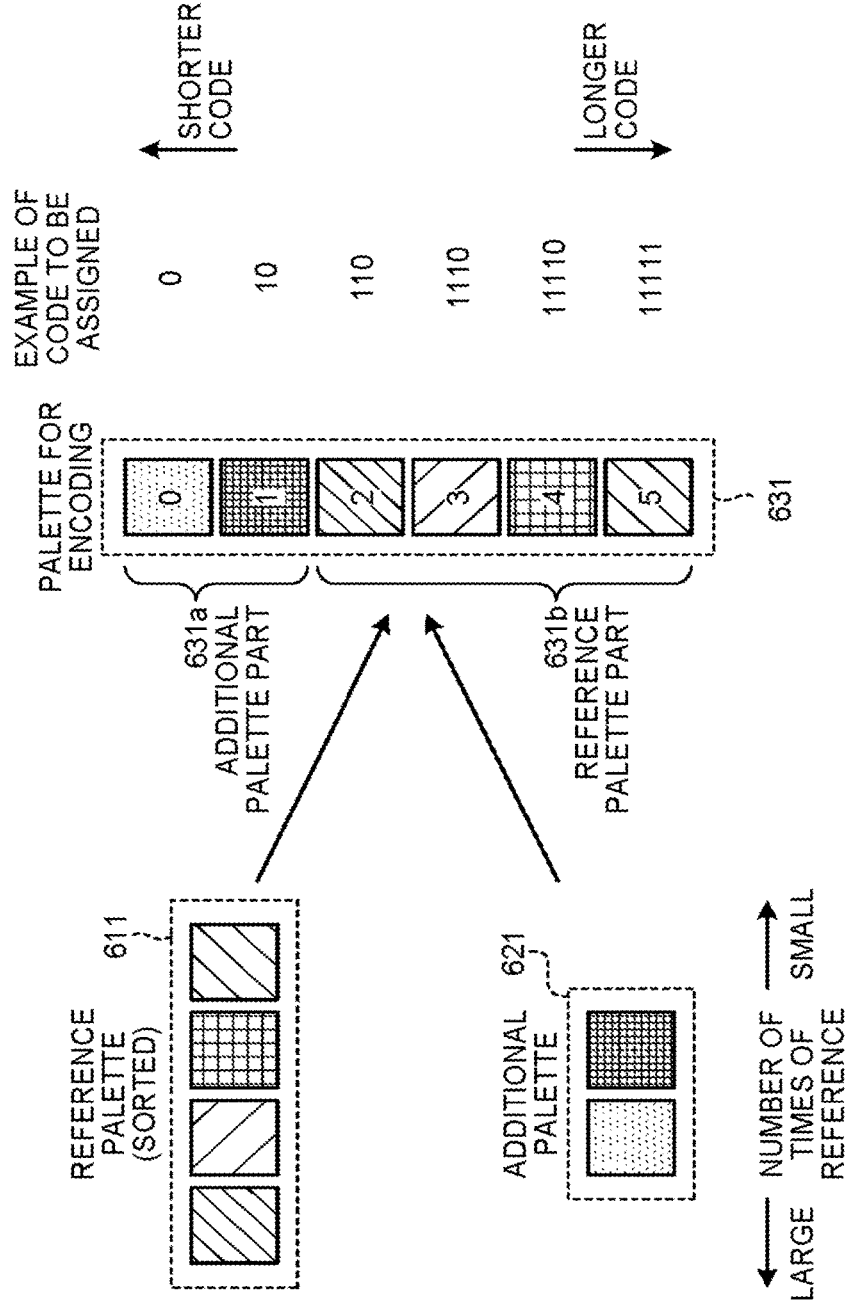

FIG.8

```
//INITIALIZATION
    for(i=0; i<(NUMBER OF COLORS IN PALETTE FOR ENCODING); i++){
        if(i<NUMBER OF COLORS IN ADDITIONAL PALETTE) isCoded[i] = false;
        else                                         isCoded[i] = true;
    }

//ENCODING PROCESSING
    ENCODING OF NUMBER OF COLORS IN ADDITIONAL PALETTE;
    for(i=0; i<(SIZE OF OPERATION UNIT); i++){
        ENCODING OF INDEX[i];
        if(isCoded[INDEX[i]] == false){
            ENCODING OF COLOR INFORMATION OF ADDITIONAL PALETTE[INDEX[i]];
            isCoded[INDEX[i]] = true;
        }
    }
```

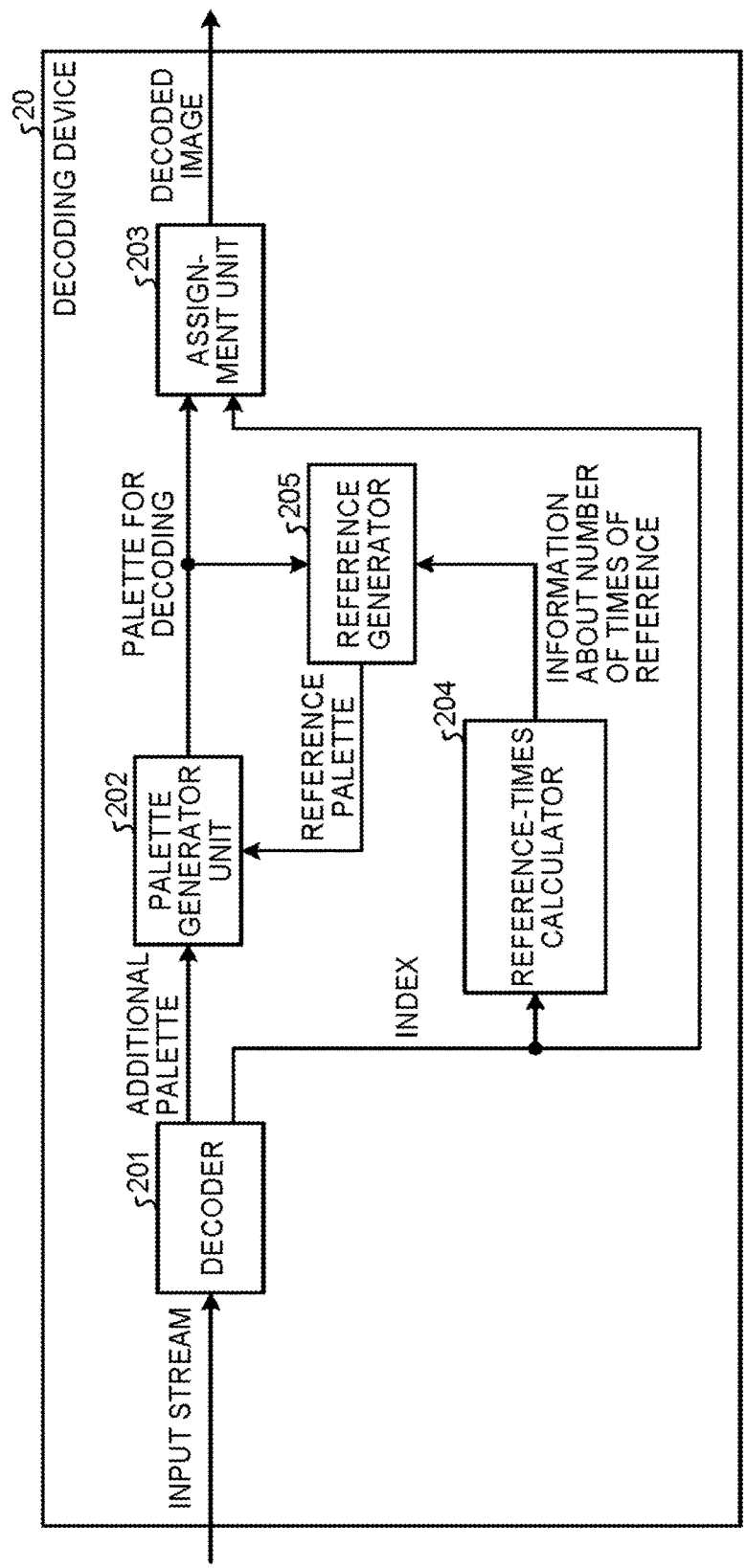

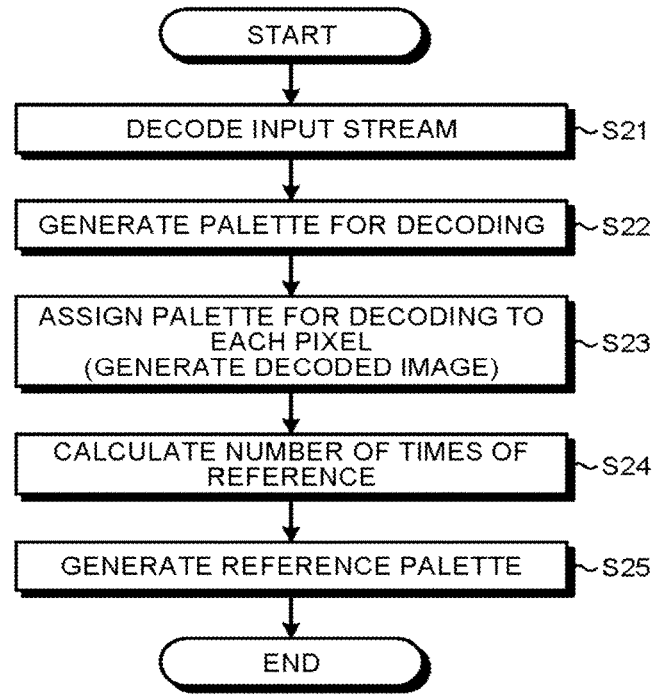
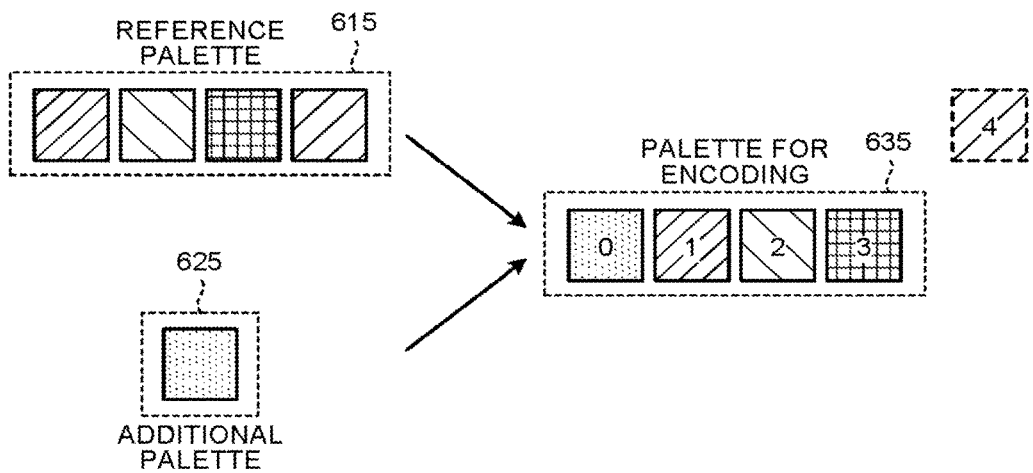

ENCODING DEVICE, DECODING DEVICE, AND IMAGE PROCESSING DEVICE

CROSS-REFERENCE TO RELATED APPLICATION

This application is based upon and claims the benefit of priority from Japanese Patent Application No. 2015-161235, filed on Aug. 18, 2015; the entire contents of all of which are incorporated herein by reference.

FIELD

Embodiments described herein relate generally to an encoding device, a decoding device, and an image processing device.

BACKGROUND

In the related art, as a method for encoding an image, a color palette encoding method is known for representing the image with a palette holding one or more colors included in the image and an index indicating the color of each pixel of the image included in the palette. In the color palette encoding method, a method for efficiently encoding the palette or the index is important to improve efficiency of encoding the image.

As a technique to which such a color palette encoding method is applied, a technique is known for improving encoding efficiency by creating a palette from a pixel encoded earlier than a pixel as an encoding target. Another technique is known for improving encoding efficiency by acquiring appearance frequency of the color from an input image (or part thereof) in advance, and performing variable length encoding on the index based on the frequency to reduce a code amount of the index.

BRIEF DESCRIPTION OF THE DRAWINGS

FIG. 7 is a diagram for explaining an operation of an encoder of the encoding device;

FIG. 8 is a diagram illustrating an example of a processing code for alternately encoding an index and an additional palette;

FIG. 9 is a diagram illustrating an example of a functional block configuration of a decoding device;

FIG. 12 is a flowchart illustrating an example of decoding processing performed by the decoding device;

FIG. 13 is a diagram for explaining an operation of a palette generator of an encoding device according to a second embodiment;

DETAILED DESCRIPTION

According to an embodiment, an encoding device includes a determination unit, a first palette generator, a first assignment unit, an encoder, and a first reference generator. The determination unit is configured to determine an additional palette that holds a color not included in a first reference palette among colors included in a predetermined operation unit of an input image. The first palette generator is configured to generate a palette for encoding including a color included in the additional palette and a color included in the first reference palette. The first assignment unit is configured to assign, to each pixel in the operation unit, an index indicating a color in the palette for encoding corresponding to a color of the pixel. The encoder is configured to encode the index and information on the additional palette. The first reference generator is configured to generate the first reference palette from the palette for encoding.

The following describes an encoding device, a decoding device, and an image processing device according to embodiments in detail with reference to the drawings. The drawings are schematic only, so that a specific configuration should be determined considering the following description.

First Embodiment

Figure 1:
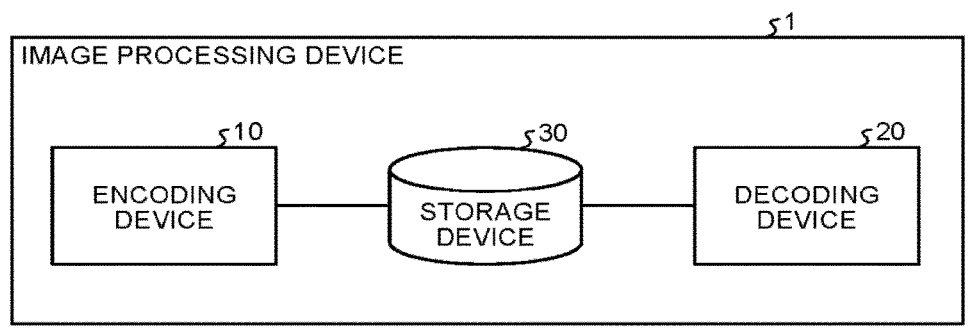
FIG. 1 is a diagram illustrating an example of the entire configuration of an image processing device.

FIG. 1 is a diagram illustrating an example of the entire configuration of an image processing device according to some embodiments. The following describes the entire configuration of an image processing device 1 with reference to FIG. 1.

As illustrated in FIG. 1, the image processing device 1 according to a first embodiment includes an encoding device 10, a decoding device 20, and a storage device 30.

The encoding device 10 is a device that performs encoding processing on an input image for each predetermined operation unit (hereinafter, simply referred to as a "operation unit") (for example, a one-dimensional or a two-dimensional pixel block including one or more pixels). The encoding device 10 represents each pixel in the operation unit with a palette for encoding including one or more pixels and an index indicating a color to be referred to in the palette for encoding, and performs encoding processing for encoding the index and information on an additional palette including a pixel different from that in a reference palette (described later) in the palette for encoding.

The decoding device 20 performs decoding processing that decodes, from a bit stream encoded by the encoding device 10, the information on the additional palette and the index, generates a palette for decoding (the same as the palette for encoding), and assigns a color indicated by the index in the palette for decoding to each pixel in the operation unit to generate a decoded image.

The storage device 30 is a device that temporarily stores therein the bit stream generated by the encoding device 10 through the encoding processing. The bit stream on which decoding processing is performed by the decoding device 20 is read from the storage device 30. The storage device 30 is implemented by a random access memory (RAM) 504 illustrated in FIG. 2 (described later).

Figure 2:
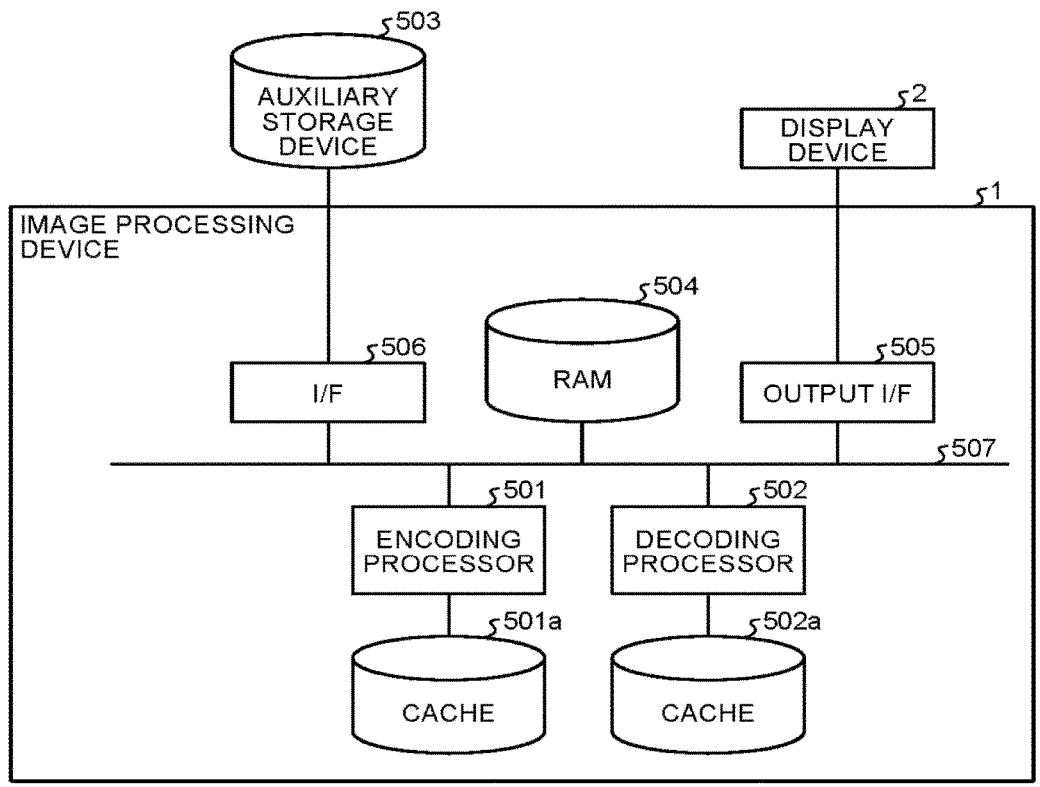
FIG. 2 is a diagram illustrating an example of a hardware configuration of the image processing device.

FIG. 2 is a diagram illustrating an example of a hardware configuration of some image processing devices. The following describes a hardware configuration of the image processing device 1 with reference to FIG. 2.

As illustrated in FIG. 2, the image processing device 1 includes an encoding processor 501, a cache 501a, a decoding processor 502, a cache 502a, an auxiliary storage device 503, the RAM 504, and an output interface (I/F) 505.

The encoding processor 501 is an arithmetic device that controls the entire operation of the encoding device 10 illustrated in FIG. 1. The encoding processor 501 performs encoding processing of the encoding device 10.

The cache 501a is a memory that temporarily stores therein data to be processed by the encoding processor 501 as a work area.

The decoding processor 502 is an arithmetic device that controls the entire operation of the decoding device 20 illustrated in FIG. 1. The decoding processor 502 performs decoding processing of the decoding device 20.

The cache 502a is a memory that temporarily stores therein data to be processed by the decoding processor 502 as a work area.

The auxiliary storage device 503 is a storage device that stores therein an input image input by the encoding device 10. The auxiliary storage device 503 is a storage device that can electrically, magnetically, or optically store therein data such as a hard disk drive (HDD), a solid state drive (SSD), a flash memory, or an optical disc. The auxiliary storage device 503 may be replaced with an image acquiring device (such as a camera), a network, another processing device, or the like.

The RAM 504 is a volatile storage device that temporarily stores therein the bit stream generated by the encoding device 10 through the encoding processing. The bit stream on which decoding processing is performed by the decoding device 20 is read from the RAM 504. The RAM 504 is, for example, a static RAM (SRAM) or a dynamic RAM (DRAM).

As illustrated in FIG. 2, the output I/F 505 is an output interface to which a display device 2 that displays an image is connected, for example.

As illustrated in FIG. 2, an I/F 506 is an interface to which the auxiliary storage device 503 is connected, for example.

The encoding processor 501, the decoding processor 502, the auxiliary storage device 503, the RAM 504, the output I/F 505, and the I/F 506 are connected to each other in a communicable manner via a bus 507 such as an address bus and a data bus.

The display device 2 is, for example, a display device such as a liquid crystal display, a plasma display, or an organic electro-luminescence (EL) display that displays the decoded image decoded by the decoding device 20. The display device 2 may be replaced with an auxiliary storage device (for example, a storage device that can electrically, magnetically, or optically store therein data such as an HDD, an SSD, a flash memory, or an optical disc), a network, or another signal processing device.

In the example of the hardware configuration illustrated in FIG. 2, the encoding processor 501 and the decoding processor 502 are different processors. However, the embodiment is not limited thereto. The encoding processor 501 and the decoding processor 502 may be formed on one chip.

Figure 3:
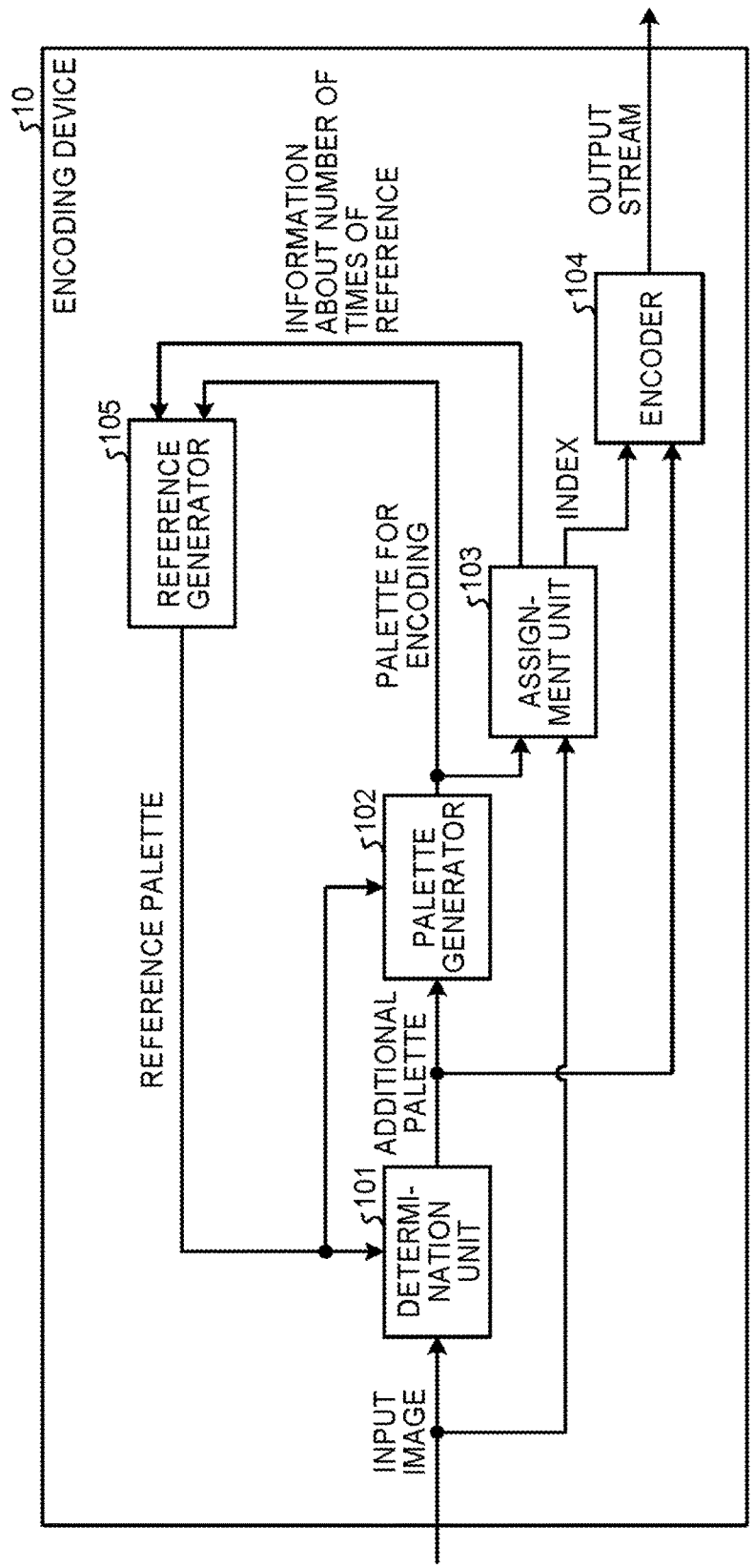
FIG. 3 is a diagram illustrating an example of a functional block of an encoding device.
Figure 4:
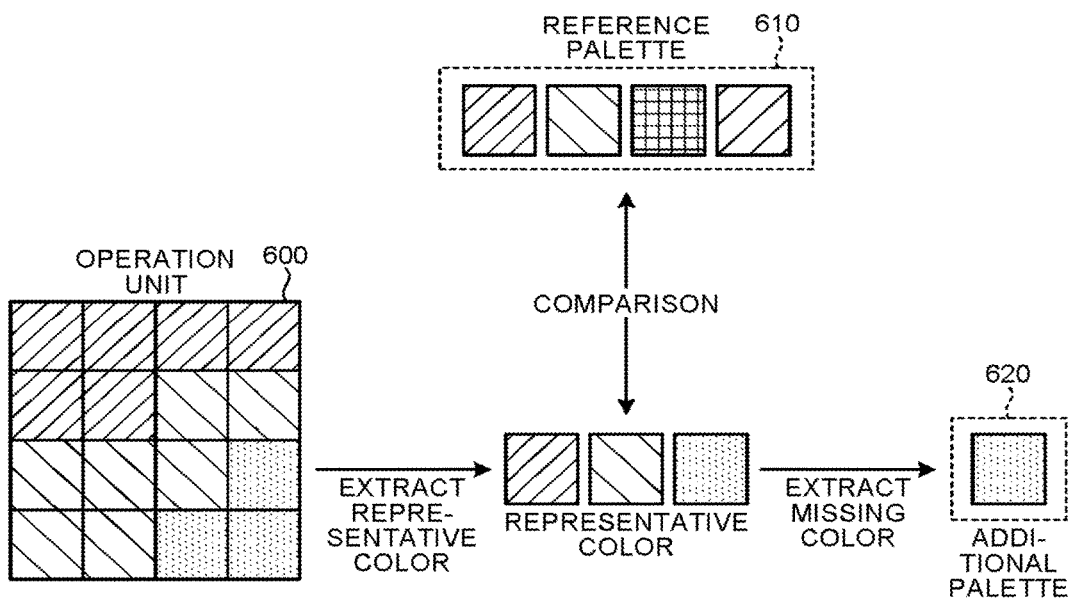
FIG. 4 is a diagram for explaining an operation of a determination unit of the encoding device.
Figure 5:
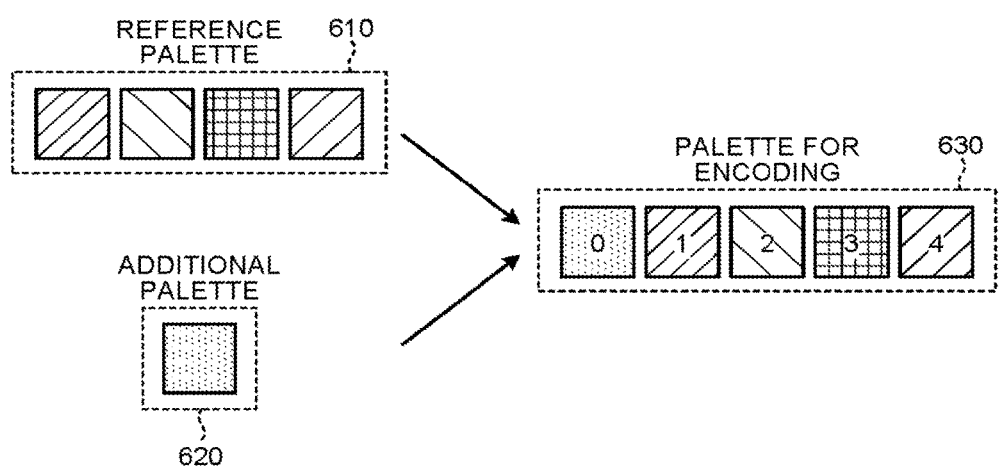
FIG. 5 is a diagram for explaining an operation of a palette generator of the encoding device.
Figure 6:
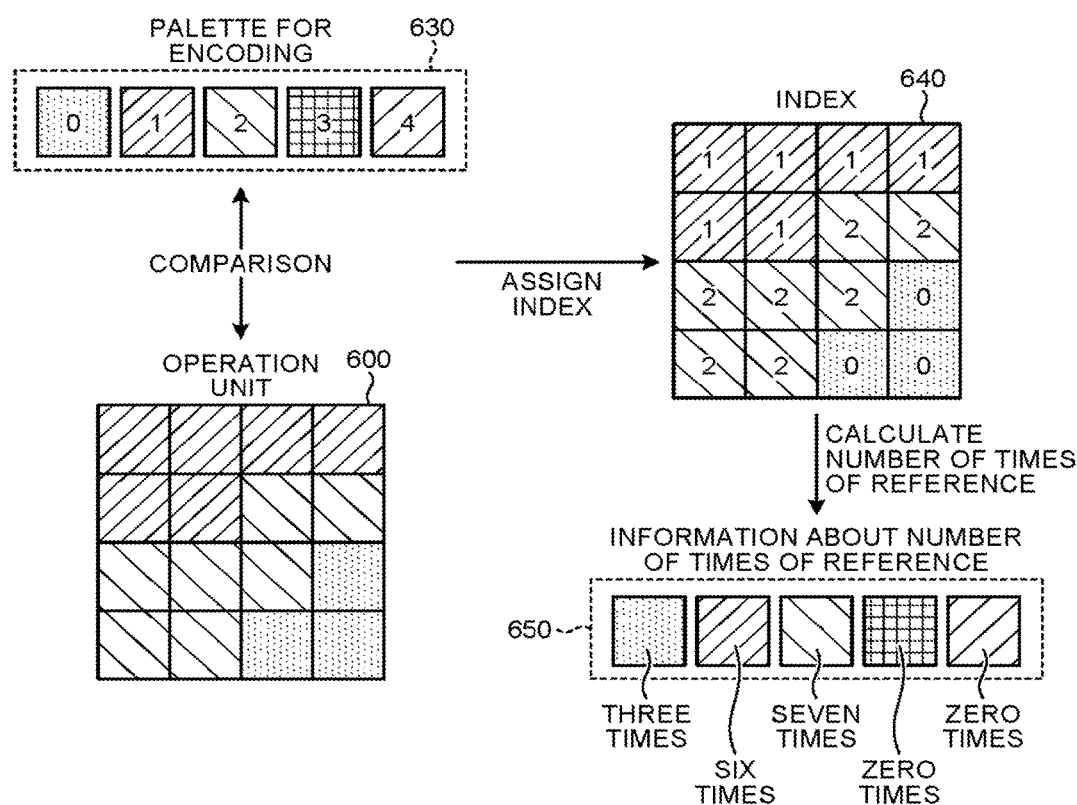
FIG. 6 is a diagram for explaining an operation of an assignment unit of the encoding device.

FIG. 3 is a diagram illustrating an example of a functional block configuration of the encoding device according to the first embodiment. FIG. 4 is a diagram for explaining an operation of a determination unit of the encoding device according to the first embodiment. FIG. 5 is a diagram for explaining an operation of a palette generator of the encoding device according to the first embodiment. FIG. 6 is a diagram for explaining an operation of an assignment unit of the encoding device according to the first embodiment. FIG. 7 is a diagram for explaining an operation of an encoder of the encoding device according to the first embodiment. FIG. 8 is a diagram illustrating an example of a processing code for alternately encoding the additional palette and the index of the encoder according to the first embodiment. The following describes a configuration and an operation of a functional block of the encoding device 10 of the image processing device 1 with reference to FIGS. 3 to 8.

As illustrated in FIG. 3, the encoding device 10 according to the first embodiment includes a determination unit 101, a palette generator 102 (first palette generator), an assignment unit 103 (first assignment unit), an encoder 104, and a reference generator 105 (first reference generator).

The determination unit 101 is a functional unit that receives an input image (for example, an image stored in the auxiliary storage device 503 illustrated in FIG. 2, or an image received via the output I/F 505) from the outside, receives the reference palette (first reference palette) from the reference generator 105, and determines the additional palette for each operation unit of the input image. To encode the input image while maintaining favorable image quality by the encoding device 10, the palette for encoding generated by the palette generator 102 (described later) needs to hold sufficient colors for representing the color of each pixel included in the operation unit. Thus, the additional palette generated by the determination unit 101 may hold a color missing in the reference palette from the reference generator 105, that is, a color of a pixel not having the same or a similar pixel included in the reference palette among the colors of the pixels included in the operation unit of the input image. Specifically, the determination unit 101 determines, for example, the additional palette using a method illustrated in FIG. 4. First, the determination unit 101 classifies the colors of the pixels included in an operation unit 600 of the input image illustrated in FIG. 4 into groups of the same or a similar color. A case in which two colors are the same or similar to each other means a case in which a condition represented by the following Expression (1) is satisfied, for example.

$$|r1-r2|+|g1-g2|+|b1-b2|<Th \qquad (1)$$

In this case, r, g, and b are pixel values of colors (red, green, and blue) of the pixel. For example, (r1, g1, b1) are pixel values of one of the two colors, and (r2, g2, b2) are pixel values of the other one of the two colors. Also, Th is a predetermined threshold. In the example illustrated in FIG. 4, the determination unit 101 classifies the operation unit 600 into three groups.

In Expression (1), the color is represented by the three pixel values of r, g, and b. Alternatively, the number of components of the pixel may be optional (for example, one, two, or four), or a color system other than r, g, and b (for example, a YUV color space or a Lab color space) may be used. In addition to performing threshold determination on the sum of difference absolute values between the pixel values as represented by Expression (1), the determination unit 101 may perform threshold determination on a maximum value or a minimum value of the difference absolute values between the pixel values.

Next, the determination unit 101 determines a color representing each group (representative color) in the operation unit 600. The representative color may be, for example, an average value of the colors of the pixels included in each group. The representative color may be, for example, a mode in each group. For simplifying a process, a color of a predetermined pixel (for example, a pixel first scanned in order of raster scanning) in each group may be used as the representative color as it is.

Next, the determination unit 101 determines whether there is a color being the same as or similar to the representative color of each group in the reference palette 610 from the reference generator 105 through Expression (1) or the following Expression (2). If there is no color being the same as or similar to the representative color in the reference palette 610 as a result of determination through Expression (1) or (2), the determination unit 101 extracts the representative color as a missing color, and adds the missing color as a color constituting an additional palette 620 to determine the additional palette 620.

$$(|r1-r2|+|g1-g2|+|b1-b2|) \times N < Th \qquad (2)$$

In this case, N is the number of pixels included in a classified group. When the determination unit 101 uses Expression (1) or (2) for comparing the representative color of each group with the color included in the reference palette 610, for example, (r1, g1, b1) may be assumed to be the pixel values of the representative color, and (r2, g2, b2) may be assumed to be the pixel values of the color included in the reference palette 610. The threshold Th in Expressions (1) and (2) may be the same as or different from the threshold Th in Expression (1) used when the determination unit 101 classifies the color of the pixel included in the operation unit 600 into the group of the same or a similar color.

In the example of FIG. 4, the color constituting the additional palette 620 is one. Alternatively, it goes without saying that a plurality of colors may constitute the additional palette 620. In this case, the determination unit 101 calculates the number of pixels (number of times of reference) in the group having the color constituting the additional palette 620 as the representative color, and sorts the additional palette 620 in descending order of the number of times of reference.

The determination unit 101 then transmits the determined additional palette 620 to the palette generator 102 and the encoder 104. The determination unit 101 is implemented by the encoding processor 501 illustrated in FIG. 2.

In the method of determining the additional palette 620 described above, it is determined whether the color being the same as or similar to the color of the pixel is included in the reference palette 610 in predetermined scanning order (for example, order of raster scanning) for each pixel in the operation unit, and if the color is not included in the reference palette 610, the color is sequentially added to the additional palette 620. In this case, a plurality of the same or similar colors may be included in the additional palette 620, and encoding efficiency may be lowered, so that the determination unit 101 may determine whether there is the same or a similar color in the additional palette 620 generated up to a preceding pixel before adding the color of each pixel in the operation unit to the additional palette 620, and may add the color to the additional palette 620 only when there is no same or similar color.

As an alternative to the method of determining the additional palette 620 described above, the determination unit 101 may set a plurality of additional palette patterns, calculate or estimate an encoding error (an error between the color of each pixel of the input image and the color assigned by the assignment unit 103 (for example, a sum of difference absolute values or a sum of difference square values)) and a generated code amount in a case in which an assigning operation and an encoding operation are performed by the assignment unit 103 and the encoder 104 for each of the additional palette patterns, and perform rate-distortion optimization so that a cost (Cost) in the following Equation (3) is minimized based on the above values to determine the additional palette. The additional palette patterns may be prepared by changing a threshold, for example, when each pixel of the input image is classified into a group including the same or similar colors. Alternatively, the additional palette patterns may include the arbitrarily selected colors of pixels from the input image.

$$\text{Cost} = \text{Distortion} + \text{lambda} \times \text{Rate} \qquad (3)$$

In Equation (3), Cost represents the cost, Distortion represents an error (or an estimation value thereof), Rate represents a code amount (or an estimation value thereof), and lambda represents a predetermined coefficient.

The number of colors included in the additional palette 620 is equal to or larger than zero and equal to or smaller than a predetermined number of colors (for example, the number of pixels in the operation unit), and may vary depending on the operation unit. The predetermined number of colors may be set to be smaller than the number of pixels in the operation unit. In this case, for example, the determination unit 101 may preferentially insert the color having a larger error (for example, a larger value of the left side of Expression (1) or (2) described above) into the additional palette 620. In such a case, the additional palette 620 cannot hold all the colors in some cases when the number of colors in the operation unit is large. However, the size of a palette for encoding 630 (described later) is reduced, so that the code amount of the index can be reduced.

The palette generator 102 is a functional unit that receives the additional palette and the reference palette from the determination unit 101 and the reference generator 105, respectively, and integrates the colors included in the additional palette and the reference palette to generate the palette for encoding. Specifically, as illustrated in FIG. 5, the palette generator 102 generates the palette for encoding 630 as a palette including all of the colors included in the reference palette 610 and the colors included in the additional palette 620. The number of colors included in the additional palette 620 is equal to or larger than zero and equal to or smaller than the predetermined number of colors, and is variable for each operation unit, so that the size of the palette for encoding 630 may be similarly variable for each operation unit.

The palette generator 102 arranges the additional palette 620 at the head, and arranges the reference palette 610 subsequent thereto to generate the palette for encoding 630. Among the colors in the palette for encoding 630, part of the colors derived from the additional palette 620 is sorted in descending order of the number of times of reference by the determination unit 101 as described above, and part of the colors derived from the reference palette 610 is sorted in descending order of the number of times of reference in a preceding operation unit by the reference generator 105 as described later.

For example, as illustrated in FIG. 5, the palette generator 102 gives numbers to the palette for encoding 630 in ascending order from the head thereof. In the example of FIG. 5, the palette for encoding 630 includes five colors, and numbers "0" to "4" are given thereto in this order from the head. That is, the palette for encoding 630 includes not only information (pixel values) of included colors but also information on the numbers given to the respective colors. The number given to the palette for encoding 630 by the palette generator 102 as described above corresponds to an index assigned to the operation unit by the assignment unit 103 as described later. If the numbers are given as described above, the encoder 104 can implement variable length encoding of the index (described later) by assigning a shorter code as the number is smaller, as described later. In the example illustrated in FIG. 5, the order of giving the numbers to the palette for encoding 630 is exemplary only. The numbers may be given in different order.

The palette generator 102 then transmits the generated palette for encoding 630 to the assignment unit 103 and the reference generator 105. The palette generator 102 is implemented by the encoding processor 501 illustrated in FIG. 2.

The assignment unit 103 is a functional unit that receives the input image from the outside, receives the palette for encoding from the palette generator 102, and assigns, as the index, a number indicating a corresponding color in the palette for encoding (a number given by the palette generator 102) to each pixel in the operation unit for each operation unit of the input image. Specifically, as illustrated in FIG. 6, the assignment unit 103 compares the color of each pixel in the operation unit 600 with each color in the palette for encoding 630, selects the closest color from the palette for encoding 630, and assigns, as the index, the number corresponding to the selected color to each pixel in the operation unit 600. As illustrated in FIG. 6, information obtained when the assignment unit 103 assigns, as the index, the number of the palette for encoding 630 to each pixel in the operation unit 600 is assumed to be an index 640. An indicator for closeness of colors may be, for example, a sum of difference absolute values of all components between the pixels of the colors in the operation unit 600 and the palette for encoding 630. A color having the smallest indicator is the closest color. As another indicator, for example, a sum of difference square values between the pixel values of the respective colors may be used. Alternatively, a maximum value of a difference absolute value or a difference square value between the pixel values of the respective colors may be used as the index value.

The assignment unit 103 calculates, in the operation unit 600, the number of times of reference indicating the number of times when the color is referred to as the closest color in the palette for encoding 630 (the number of pixels closest to the color in the operation unit 600). FIG. 6 illustrates an example in which the number of pixels (number of times of reference) having the color in the operation unit 600 closest to the color having the number "0" in the palette for encoding 630 is three, the number of pixels having the color closest to the color having the number "1" is six, and the number of pixels having the color closest to the color having the number "2" is seven.

The assignment unit 103 then transmits the index 640 obtained by assigning the index to each pixel in the operation unit 600 to the encoder 104, and transmits information 650 of the number of times of reference indicating the calculated number of times of reference to the reference generator 105. The information 650 of the number of times of reference is information associating the number (index) given to the palette for encoding 630 with the number of times of reference. The assignment unit 103 is implemented by the encoding processor 501 illustrated in FIG. 2.

The encoder 104 is a functional unit that receives the additional palette from the determination unit 101, receives the index (the index 640 illustrated in FIG. 6) from the assignment unit 103, and encodes the additional palette (the number of colors and color information) and the index to generate an output stream. The encoder 104 then outputs the generated output stream to the outside (the storage device 30 illustrated in FIG. 1 and the like). The encoder 104 is implemented by the encoding processor 501 illustrated in FIG. 2.

The additional palette first holds the colors the number of which is equal to or larger than zero and equal to or smaller than a predetermined number, and the number of held colors varies depending on the operation unit, so that the encoder 104 encodes the number of colors included in the additional palette and information (color information) indicating each color included in the additional palette.

The encoder 104 encodes the number of colors included in the additional palette with a fixed bit length determined in advance, for example. The fixed bit length may be a bit length that can sufficiently encode values from zero to the predetermined number of colors. For example, it is sufficient that the fixed bit length is four bits when the predetermined number of colors is fifteen.

The encoder 104 may perform variable length encoding on the number of colors included in the additional palette. The additional palette holds only colors missing in the reference palette to encode the operation unit as an encoding target. Accordingly, if the reference palette holds sufficient colors, the number of colors included in the additional palette tends to be zero or a small value. By assigning a shorter code as the number of colors included in the additional palette is closer to zero, and assigning a longer code as the number of colors is larger to perform encoding, an average code amount required for encoding the number of colors included in the additional palette can be reduced. The code corresponding to each number of colors may be set in a table determined in advance. Alternatively, the encoder 104 may encode the number of colors in the additional palette using a variable length code table that is typically used including an alpha code, a Golomb code, an Exponential-Golomb code, and the like.

Next, the encoder 104 encodes information (color information) indicating each color included in the additional palette. The color information on each color may indicate each value of three components of R (red), G (green), and B (blue), for example. Alternatively, the color information may be represented as a value of each component of a color system such as a YUV color space and a Lab color space. The encoder 104 encodes a value of a component as the color information on each color in the additional palette with a fixed bit length determined in advance, or encodes the value with a variable length using a table determined in advance. When the additional palette includes no color (the number of colors is zero) in a certain operation unit, the encoder 104 does not necessarily encode the color information in the operation unit.

For example, the color information is represented by the YUV color space, a Y component may be encoded with a fixed length, and U and V components may be encoded with a variable length (for example, a code for zero (no color difference) is set to be shorter, and a code becomes longer as an absolute value of a color difference is larger).

The encoder 104 may determine order of encoding the color information on each color in the additional palette based on the number of times when the color is referred to as the closest color in the additional palette in the operation unit of the encoding target. In this case, the encoder 104 may encode the color information on each color in the additional palette in descending order (or ascending order) of the number of times of reference. Accordingly, as described later, the decoding device 20 can determine the order of the number of times of reference of each color included in the additional palette, and variable length encoding can be implemented in encoding or decoding the index (described later) using the information. In this case, the encoder 104 may receive information about the number of times of reference from the assignment unit 103.

Next, the encoder 104 encodes the index assigned to each pixel in the operation unit by the assignment unit 103. The index holds any value equal to or larger than zero and smaller than the number of colors in the palette for encoding for each pixel in the operation unit. As illustrated in FIG. 7, the palette for encoding 631 is generated by integrating a reference palette 611 and an additional palette 621 by the palette generator 102, so that the palette for encoding 631 holds colors derived from the reference palette (reference palette part 631*b*) and colors derived from the additional palette (additional palette part 631*a*). The reference palette 611 is sorted based on the number of times of reference in a preceding operation unit by the reference generator 105 (described later), and the additional palette 621 is sorted based on the number of times of reference by the determination unit 101 as described above.

To reduce the code amount of the index, the encoder 104 performs variable length encoding on each index as illustrated in FIG. 7. Specifically, as illustrated in FIG. 7, the encoder 104 encodes the index corresponding to the color derived from the additional palette (additional palette part 631*a*) in the palette for encoding 631 with a shorter code as the number of times of reference is larger in the operation unit of the encoding target. The number of times of reference can be derived when the encoder 104 counts the number of times of reference for the index. In the decoding device 20, descending order of the number of times of reference can be derived from order of encoding each color in the additional palette as described above.

Also, as illustrated in FIG. 7, the encoder 104 encodes the index corresponding to the color derived from the reference palette (reference palette part 631*b*) in the palette for encoding 631 with a shorter code in order from the index corresponding to the color at a higher rank in the order sorted by the reference generator 105.

The encoder 104 encodes the index corresponding to the color derived from the additional palette (additional palette part 631*a*) with a shorter code than that for the index corresponding to the color derived from the reference palette (reference palette part 631*b*). The color derived from the reference palette (reference palette part 631*b*) is a color utilized in the previous operation unit, and the color derived from the additional palette (additional palette part 631*a*) is a color that is necessarily referred to in a current operation unit, so that the code amount of the index can be reduced by performing such variable length encoding.

The encoder 104 assigns the code to be used for variable length encoding based on a table determined in advance. For example, in the example of the table illustrated in FIG. 7, the indices "0", "1", "2", "3", "4", and "5" of the palette for encoding 631 are assigned to "0", "10", "110", "1110", "11110", and "11111", respectively.

The encoder 104 may encode the index using the variable length code table that is typically used including an alpha code, a Golomb code, an Exponential-Golomb code, and the like. The encoder 104 may change the table or a parameter thereof (such as a suffix length of the Golomb code) for each operation unit. The parameter may be encoded for each operation unit, or may be set based on the number of colors in the additional palette, for example. Typically, when the number of colors in the operation unit is large, the value of the index tends to be easily distributed. Accordingly, for example, when the number of colors in the palette for encoding 631 is large, an average code amount for encoding the index can be reduced by utilizing a table in which inclination of a code length is gentle (the code length is substantially constant).

In the above description, the index corresponding to the color derived from the additional palette of the palette for encoding 631 is encoded with a shorter code than that for the color derived from the reference palette. However, the embodiment is not limited thereto. Specifically, when the number of times of reference for the color derived from the reference palette in the operation unit is equal to or larger than a predetermined threshold, the encoder 104 may encode the index corresponding to this color with a shorter code than that for the color derived from the additional palette. For example, if the previous operation unit is flat and only one color is referred to, the next operation unit may be flat and the same color is referred to with high possibility. In such a case, the code amount of the index can be reduced by encoding the corresponding index with a short code.

Instead of encoding the index for each pixel in the operation unit, the encoder 104 may collectively encode the indices for each predetermined block. Typically, adjacent pixels probably have similar colors, so that the indices thereof are probably the same. The encoder 104 may divide the operation unit into a plurality of blocks, and encode a flag (hereinafter, referred to as a single index flag) indicating whether the indices in the block are all the same for each of the divided blocks. If the flag is true, the encoder 104 may encode only one index. If the single index flag is false, the encoder 104 may encode the index for each pixel in the block. In this case, the block may be obtained by dividing the operation unit using a predetermined method (for example, dividing into two equal parts, dividing into four equal parts, or dividing in units of a pixel line when the operation unit is a two-dimensional image region). When the operation unit is divided into a plurality of blocks and the indices in the block are all the same as described above, the index can be encoded with a smaller code amount in a flat image region of the input image by encoding only one of the indices.

The encoder 104 may divide the operation unit into blocks in a hierarchical manner, and encode a flag indicating whether the indices in the block of each hierarchy are all the same. Specifically, the encoder 104 first encodes the flag in a first hierarchical block (the same as the operation unit), and if the flag is true, encodes one index. If the flag is false, the encoder 104 similarly encodes the flag for each of second hierarchical blocks obtained by dividing the first hierarchical block. In this case, the second hierarchical block is a block obtained by dividing the first hierarchical block using a predetermined method (for example, dividing into two equal parts, or dividing into four equal parts). Also in the second hierarchical block, the encoder 104 encodes one index if the flag is true, and proceeds to the next hierarchy if the flag is false. The above processing is performed for a predetermined number of hierarchies. When the last hierarchy is reached, the index is encoded for each pixel of the last hierarchical block. With the method of dividing the block in a hierarchical manner as described above, the index can be encoded with a small code amount in a flat region of the input image.

In encoding the index for each pixel in the operation unit, the encoder 104 may encode one-bit flag (hereinafter, referred to as a skip flag) indicating whether the index is identical to a prediction index. In this case, the encoder 104 further encodes the index only if the skip flag is false. In encoding the index in this case, the index identical to the prediction index cannot be encoded (the skip flag is true in this case), so that the encoder 104 may perform variable length encoding excluding the index identical to the prediction index. In this case, the encoder 104 calculates the prediction index using, for example, the following Expression (4) based on values of the indices of left, upper, and upper left pixels of a pixel of interest.

$$\text{prediction index} = \begin{cases} \text{index of upper pixel,} \\ \quad \text{if(index of left pixel} = \text{index of upper left pixel);} \\ \text{index of upper left pixel,} \\ \quad \text{if((index of left pixel} = \text{index of upper pixel) AND} \\ \quad \text{(index of left pixel} \neq \text{index of upper left pixel));} \\ 0, \\ \quad \text{if(pixel of interest} = \text{pixel at upper left end of operation unit);} \\ \text{index of left pixel,} \\ \quad \text{if(other than above conditions)} \end{cases} \quad (4)$$

With the method of using the skip flag indicating whether the index is identical to the prediction index as described above, the index can be encoded with a small code amount in a flat region of the input image.

The encoder 104 may use a combination of a method of encoding the single index flag for each block obtained by dividing the operation unit and a method of encoding a corresponding skip flag for each pixel of the operation unit.

In the above description, the encoder 104 first encodes the information on the additional palette (the number of colors and the color information), and subsequently, encodes the index. Alternatively, the encoder 104 may encode the information on the additional palette after encoding the index.

In the above description, the encoder 104 first encodes the information on the additional palette (the number of colors and the color information), and subsequently, encodes the index. Alternatively, the encoder 104 may alternately encode the index and the information on the additional palette as represented by the processing code illustrated in FIG. 8. Considering a case in which the decoding device 20 is operated by a sequential circuit, each pixel in the decoded image can be decoded only when the index and the palette (palette for decoding) are prepared, so that a buffer in decoding can be reduced and processing delay can be reduced if the index and the additional palette are alternately encoded.

To implement the above configuration, for example, the encoder 104 encodes the index and the additional palette in order of the processing code illustrated in FIG. 8. FIG. 8 exemplifies a case in which the index corresponding to the additional palette is assigned in a range from zero to (the number of colors in the additional palette−1), and the index corresponding to the reference palette is assigned in a range from (the number of colors in the additional palette) to (the number of colors in the palette for encoding). As initialization processing, the encoder 104 first initializes a variable isCoded. The variable isCoded is an array of a variable indicating "true" or "false", and has an array length equal to the number of colors in the palette for encoding. The variable isCoded is set to be "false" for an index portion corresponding to the additional palette (zero to (the number of colors in the additional palette−1)), and initialized to be "true" for an index portion corresponding to the reference palette.

Subsequently, in the encoding processing, the encoder 104 first encodes the number of colors in the additional palette (additional palette color number). Thereafter, when the index and the color information on the additional palette corresponding to the index are not encoded for each pixel (when the variable isCoded is "false"), the encoder 104 encodes the corresponding color information on the additional palette. When the color information on the additional palette is encoded, the encoder 104 sets a corresponding variable isCoded to be "true" to indicate that the color information is encoded.

The reference generator 105 is a functional unit that receives the palette for encoding and the information about the number of times of reference from the palette generator 102 and the assignment unit 103, respectively, and generates the reference palette based on the above information. In this case, the reference palette is a palette that holds a predetermined number of colors. Specifically, the reference generator 105 sorts the colors in the palette for encoding in descending order of the number of times of reference, for example, based on the information about the number of times of reference for each operation unit, and extracts a predetermined number of colors from colors at higher ranks in a sort result to be generated as the reference palette.

The reference palette may hold a predetermined number of colors including a color the number of times of reference of which is zero. This is because the color has appeared in the previous operation unit even if the number of times of reference in the current operation unit is zero, so that the color may be referred to in the next and subsequent operation units. The sort performed by the reference generator 105 may be a stable sort. That is, when the number of times of reference is the same, the color at a high rank before the sort may be kept being at the high rank. When sort processing is performed in this way, a result obtained by sorting based on the number of times of reference in the previous operation unit is reflected even when the number of times of reference is the same in the operation unit, so that efficiency in the encoder 104 performing variable length encoding on the index is improved.

The reference generator 105 then transmits the generated reference palette to the determination unit 101 and the palette generator 102. The reference generator 105 is implemented by the encoding processor 501 illustrated in FIG. 2.

The determination unit 101, the palette generator 102, the assignment unit 103, the encoder 104, and the reference generator 105 illustrated in FIG. 3 are merely conceptual functions, and are not limited to such a configuration. For example, a plurality of functional units illustrated as independent functional units in FIG. 3 may be configured as one functional unit. Alternatively, the function of one functional unit in FIG. 3 may be divided into a plurality of functions, and may be configured as a plurality of functional units.

The determination unit 101, the palette generator 102, the assignment unit 103, the encoder 104, and the reference generator 105 illustrated in FIG. 3 are all implemented by the encoding processor 501 illustrated in FIG. 2. However, the embodiment is not limited thereto. That is, at least one of the functional units may be implemented when a central processing unit (CPU) executes a computer program stored in a storage medium such as a storage device (for example, the auxiliary storage device 503 illustrated in FIG. 2).

Figure 10:
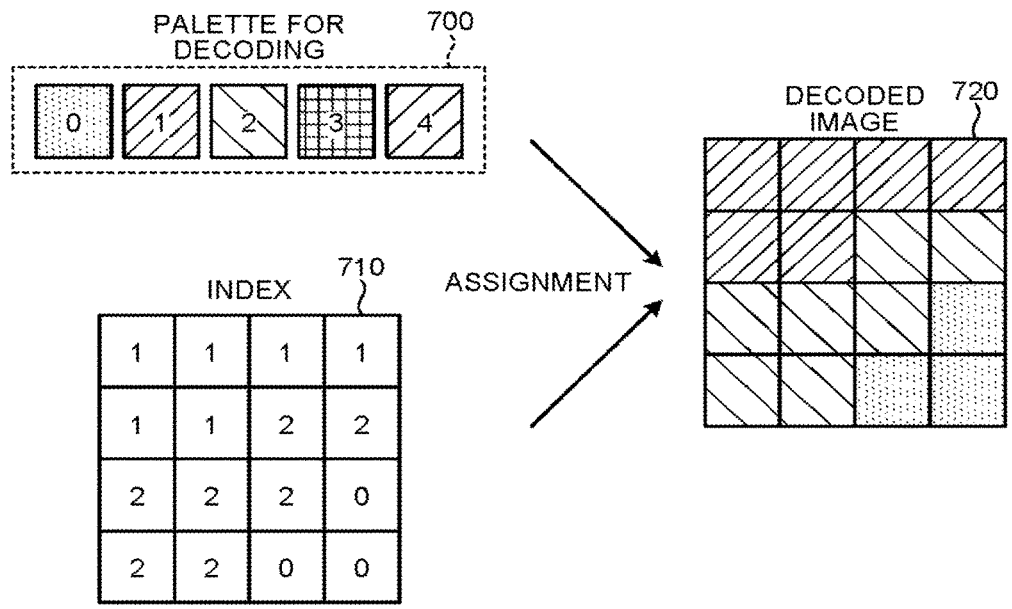
FIG. 10 is a diagram for explaining an operation of an assignment unit of the decoding device.

FIG. 9 is a diagram illustrating an example of a functional block configuration of the decoding device according to the first embodiment. FIG. 10 is a diagram for explaining an operation of the assignment unit of the decoding device according to the first embodiment. The following describes the configuration and the operation of the functional block of the decoding device 20 in the image processing device 1 with reference to FIGS. 9 and 10.

As illustrated in FIG. 9, the decoding device 20 according to the first embodiment includes a decoder 201, a palette generator 202 (second palette generator), an assignment unit 203 (second assignment unit), a reference-times calculator, and a reference generator 205 (second reference generator).

The decoder 201 is a functional unit that receives a bit stream (input stream) (for example, a bit stream stored in the RAM 504 illustrated in FIG. 2) from the outside, and decodes the input stream into the additional palette and the index. The input stream is the same as the output stream output from the encoding device 10. Specifically, by using a decoding method corresponding to the method of encoding the additional palette and the index performed by the encoder 104 of the encoding device 10, the decoder 201 decodes the input stream into these pieces of information. For example, when the encoder 104 encodes the number of colors in the additional palette, the color information on each color in the additional palette, and the index in this order, the decoder 201 first decodes the number of colors in the additional palette, decodes the color information on each color in the additional palette, and subsequently, decodes the index. When the encoder 104 encodes the additional palette and the index in different order, the decoder 201 may perform decoding in order corresponding thereto.

As described above, the encoder 104 performs variable length encoding on the index. The decoder 201 may perform decoding processing using the same table as the table used by the encoder 104 in performing variable length encoding on the index. The table may be shared by the encoding device 10 and the decoding device 20 in advance. When the encoder 104 changes the table for each operation unit, the decoder 201 may also perform decoding while changing the table. In this case, the same information as that used by the encoder 104 for changing the table may be used as information required to change the table. For example, when the encoder 104 changes the table depending on the number of colors in the additional palette, the decoder 201 may similarly switch the table depending on the number of colors in the additional palette. When the encoder 104 encodes the information for changing the table, the decoder 201 may further decode the information and switch the table.

The decoder 201 transmits the decoded additional palette to the palette generator 202, and transmits the decoded index to the assignment unit 203 and the reference-times calculator. The decoder 201 is implemented by the decoding processor 502 illustrated in FIG. 2.

The palette generator 202 is a functional unit that receives the additional palette and the reference palette (second reference palette) from the decoder 201 and the reference generator 205, respectively, and generates the palette for decoding using the same method as the method of generating the palette for encoding performed by the palette generator 102 of the encoding device 10. That is, in generating the palette for decoding, the palette generator 202 arranges the additional palette at the head, and arranges the reference palette subsequent thereto to generate the palette for decoding. Part of the colors in the palette for decoding derived from the additional palette is already sorted by the encoding device 10 in descending order of the number of times of reference, and part thereof derived from the reference palette is sorted by the reference generator 205 in descending order of the number of times of reference in the previous operation unit as described later.

Similarly to the palette generator 102 described above, the palette generator 202 gives numbers to the palette for decoding in ascending order from the head thereof. That is, the palette for decoding includes not only the information (pixel value) of included colors but also information on the numbers given to the colors. The numbers given to the palette for decoding by the palette generator 202 as described above correspond to indices for assigning the colors in the palette for decoding by the assignment unit 203 as described later.

The palette generator 202 then transmits the generated palette for decoding to the assignment unit 203 and the reference generator 205. The palette generator 202 is implemented by the decoding processor 502 illustrated in FIG. 2.

The assignment unit 203 is a functional unit that receives the index and the palette for decoding from the decoder 201 and the palette generator 202, respectively, and assigns the color in the palette for decoding corresponding to the index to each pixel in the operation unit to generate the decoded image. Specifically, as illustrated in FIG. 10, the assignment unit 203 assigns a color in a palette for decoding 700 corresponding to each value of an index 710 to each pixel in the operation unit to generate a decoded image 720. The assignment unit 203 then outputs the generated decoded image to the outside (for example, the display device 2 illustrated in FIG. 2). The assignment unit 203 is implemented by the decoding processor 502 illustrated in FIG. 2.

The reference-times calculator 204 is a functional unit that receives the index from the decoder 201, and calculates the number of times of reference indicating the number of times when each color in the palette for decoding is referred to in the operation unit. This calculation processing can be performed by counting the number of times when each value of the index appears in the operation unit. For example, in the example illustrated in FIG. 10, the value "0" of the index 710 appears three times in the operation unit, so that the number of times of reference of the color in the palette for decoding 700 corresponding to the value "0" is calculated to be "3". The reference-times calculator calculates the number of times of calculation for all the colors in the palette for decoding 700 in the same way. The reference-times calculator then transmits the information about the number of times of reference indicating the calculated number of times of reference to the reference generator 205. In this case, the information about the number of times of reference is information in which the number (index) given to the palette for decoding is associated with the number of times of reference. The reference-times calculator is implemented by the decoding processor 502 illustrated in FIG. 2.

The reference generator 205 is a functional unit that receives the palette for decoding and the information about the number of times of reference from the palette generator 202 and the reference-times calculator, respectively, and generates the reference palette based on these pieces of information using the same method as the method of generating the reference palette from the palette for encoding and the number of times of reference performed by the reference generator 105 of the encoding device 10. The reference generator 205 then transmits the generated reference palette to the palette generator 202. The reference generator 205 is implemented by the decoding processor 502 illustrated in FIG. 2.

The decoder 201, the palette generator 202, the assignment unit 203, the reference-times calculator, and the reference generator 205 illustrated in FIG. 9 are merely conceptual functions, and are not limited to such a configuration. For example, a plurality of functional units illustrated as independent functional units in FIG. 9 may be configured as one functional unit. Alternatively, the function of one functional unit in FIG. 9 may be divided into a plurality of functions, and may be configured as a plurality of functional units.

The decoder 201, the palette generator 202, the assignment unit 203, the reference-times calculator, and the reference generator 205 illustrated in FIG. 9 are all implemented by the decoding processor 502 illustrated in FIG. 2. However, the embodiment is not limited thereto. That is, at least one of the functional units may be implemented when a central processing unit (CPU) executes a computer program stored in a storage medium such as a storage device (for example, the auxiliary storage device 503 illustrated in FIG. 2).

Figure 11:
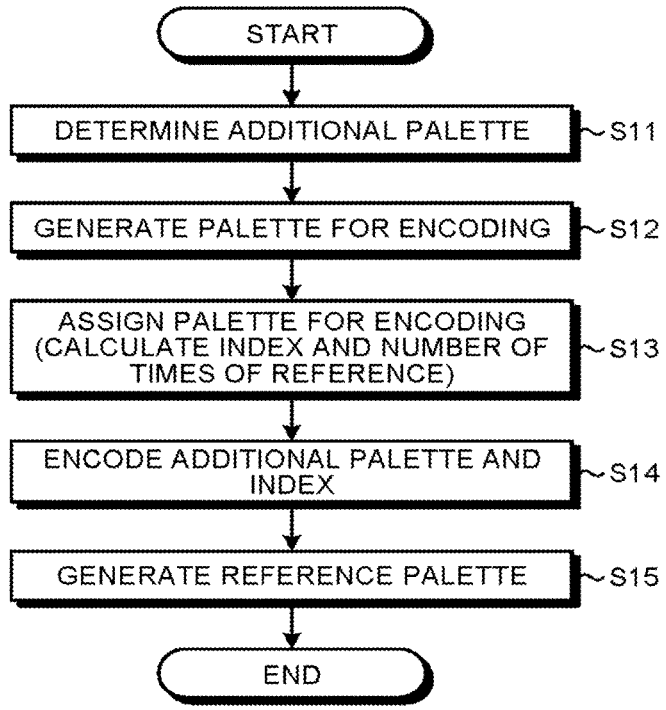
FIG. 11 is a flowchart illustrating an example of encoding processing performed by the encoding device.

FIG. 11 is a flowchart illustrating an example of encoding processing performed by the encoding device according to the first embodiment. The following describes a procedure of encoding processing performed by the encoding device 10 of the image processing device 1 with reference to FIG. 11.

Step S11

The determination unit 101 of the encoding device 10 receives the input image from the outside, receives the reference palette from the reference generator 105, and determines the additional palette for each operation unit of the input image. The determination unit 101 transmits the determined additional palette to the palette generator 102 and the encoder 104. Then the process proceeds to Step S12.

Step S12

The palette generator 102 of the encoding device 10 receives the additional palette and the reference palette from the determination unit 101 and the reference generator 105, respectively, and integrates the colors included in the additional palette and the reference palette to generate the palette for encoding. The palette generator 102 transmits the generated palette for encoding to the assignment unit 103 and the reference generator 105. Then the process proceeds to Step S13.

Step S13

The assignment unit 103 of the encoding device 10 receives the input image from the outside, receives the palette for encoding from the palette generator 102, and assigns, as the index, a number indicating a corresponding color in the palette for encoding to each pixel in the operation unit for each operation unit of the input image. The assignment unit 103 calculates the number of times of reference indicating the number of times when the color is referred to as the closest color in the palette for encoding in the operation unit (the number of pixels having a color closest to the color of interest in the operation unit). The assignment unit 103 transmits the index assigned to each pixel in the operation unit to the encoder 104, and transmits the information about the number of times of reference indicating the calculated number of times of reference to the reference generator 105. Then the process proceeds to Step S14.

Step S14

The encoder 104 of the encoding device 10 receives the additional palette from the determination unit 101, receives the index from the assignment unit 103, and encodes the additional palette (the number of colors and the color information) and the index to generate the output stream. The encoder 104 outputs the generated output stream to the outside. Then the process proceeds to Step S15.

Step S15

The reference generator 105 of the encoding device 10 receives the palette for encoding and the information about the number of times of reference from the palette generator 102 and the assignment unit 103, respectively, and generates the reference palette based on these pieces of information. The reference generator 105 sorts the colors in the palette for encoding, for example, in descending order of the number of times of reference for each operation unit based on the information about the number of times of reference, and extracts a predetermined number of colors from the colors at higher ranks in the sort result to be generated as the reference palette. The reference generator 105 then transmits the generated reference palette to the determination unit 101 and the palette generator 102. The reference palette generated by the reference generator 105 is used for generating the additional palette by the determination unit 101, and for generating the palette for encoding by the palette generator 102 in the next operation unit.

The processes at Steps S11 to S15 are repeated until the encoding of the input image is completed or interrupted for each operation unit of the input image. The order of operations at Steps S14 and S15 may be reversed, or may be performed in parallel.

FIG. 12 is a flowchart illustrating an example of decoding processing performed by the decoding device according to the first embodiment. The following describes a procedure of decoding processing performed by the decoding device 20 of the image processing device 1 with reference to FIG. 12.

Step S21

The decoder 201 of the decoding device 20 receives the bit stream (input stream) from the outside, and decodes the additional palette and the indices from the input stream. The decoder 201 transmits the decoded additional palette to the palette generator 202, and transmits the decoded index to the assignment unit 203 and the reference-times calculator. Then the process proceeds to Step S22.

Step S22

The palette generator 202 of the decoding device 20 receives the additional palette and the reference palette from the decoder 201 and the reference generator 205, respectively, and generates the palette for decoding using the same method as the method of generating the palette for encoding performed by the palette generator 102 of the encoding device 10. The palette generator 202 then transmits the generated palette for decoding to the assignment unit 203 and the reference generator 205. Then the process proceeds to Step S23.

Step S23

The assignment unit 203 of the decoding device 20 receives the index and the palette for decoding from the decoder 201 and the palette generator 202, respectively, and assigns the color in the palette for decoding corresponding to the index to each pixel in the operation unit to generate the decoded image. The assignment unit 203 outputs the generated decoded image to the outside. Then the process proceeds to Step S24.

Step S24

The reference-times calculator of the decoding device 20 receives the index from the decoder 201, and calculates the number of times of reference indicating the number of times when each color in the palette for decoding is referred to in the operation unit. The reference-times calculator transmits the information about the number of times of reference indicating the calculated number of times of reference to the reference generator 205. Then the process proceeds to Step S25.

Step S25

The reference generator 205 of the decoding device 20 receives the palette for decoding and the information about the number of times of reference from the palette generator 202 and the reference-times calculator, respectively, and generates the reference palette based on these pieces of information using the same method as the method of generating the reference palette based on the palette for encoding and the number of times of reference performed by the reference generator 105 of the encoding device 10. The reference generator 205 transmits the generated reference palette to the palette generator 202. The reference palette generated by the reference generator 205 is used for generating the palette for decoding by the palette generator 202 in the next operation unit.

The processes at Steps S21 to S25 are repeated until decoding of the bit stream is completed or interrupted for each operation unit. The operation at Step S24 may be replaced with that at Step S22 or Step S23, or may be performed in parallel.

As described above, the image processing device 1 according to the present embodiment sorts the palette for encoding (palette for decoding) in the previous operation unit based on the number of times of reference to generate the reference palette. The additional palette may hold only the colors missing in the reference palette to encode the operation unit. Accordingly, the color in the next operation unit may be included in the reference palette with high probability, and encoding is not necessarily performed on the entire palette for encoding (palette for decoding), so that the code amount for encoding the additional palette can be reduced.

The image processing device 1 according to the present embodiment performs variable length encoding (decoding) based on the information processed by the encoding device 10 (decoding device 20) up to the operation unit as an encoding (decoding) target. Specifically, in generating the reference palette from the palette for encoding (palette for decoding), the image processing device 1 according to the present embodiment sorts the colors based on the number of times when the palette for encoding (palette for decoding) is referred to in the operation unit to generate the reference palette. Typically, a color that has been referred to many times in the previous operation unit has high possibility of being referred to in the next operation unit. In contrast, a color that has not been referred to in the previous operation unit has high possibility of not being referred to in the next operation unit. Accordingly, regarding the index corresponding to each color in the sorted reference palette, a relatively short code may be assigned to the color at a higher rank in the sort order (that is, the number of times of reference is large), and a relatively long code may be assigned to the color at a lower rank to reduce an average code amount in encoding the index. When variable length encoding is performed by utilizing the reference palette that is sorted for each operation unit, a delay caused by processing of examining occurrence frequency of the index in advance and the code amount required for sharing a variable length table can be reduced.

The image processing device 1 according to the present embodiment generates the palette for encoding (palette for decoding) by synthesizing the reference palette and the additional palette. In this case, the additional palette holds each color in the operation unit as the encoding (decoding) target, the color not being the same as or similar to the color in the reference palette. That is, the color included in the additional palette is referred to at least once in the operation unit. On the other hand, there is a possibility that each color in the reference palette is never referred to in the operation unit even if the color is at a higher rank in the sort order. Thus, the image processing device 1 according to the present embodiment assigns a relatively short code to the index corresponding to each color in the additional palette as compared with the index corresponding to each color in the reference palette. Due to this, the code amount for encoding the index can be further reduced. By sequentially assigning a shorter code to each color in the additional palette in order from the index corresponding to the color the number of times of reference of which is larger based on the number of times when the color is actually referred to in the operation unit as the encoding (decoding) target, the code amount for encoding the index can be further reduced.

As described above, the image processing device 1 according to the present embodiment can reduce the code amount for encoding the input image, which can reduce a capacity of the storage device 30 that temporarily stores therein the encoded input image (bit stream).

In the encoding device 10 according to the present embodiment, each functional unit operates for each predetermined operation unit including a plurality of pixels, so that updating of the reference palette and the next encoding may be alternately performed for each operation unit, and processes that are independent of each other in the operation unit can be performed in parallel. Accordingly, the operation speed can be easily increased.

The additional palette is set for each operation unit, so that a generated error in the operation unit can be prevented. For example, by determining the additional palette by Expression (2), the additional palette is determined so that an encoding error of the pixel having many same or similar colors is relatively small, so that an average encoding error in the operation unit is reduced.

In the image processing device 1 according to the present embodiment, as illustrated in FIG. 1, the encoding device 10 and the decoding device 20 are connected to the storage device 30. However, the configuration is not limited thereto. For example, a device including the encoding device 10 may be connected to a device including the decoding device 20 via a network (transmission path). In this case, the device including the encoding device 10 transmits a bit stream obtained by encoding the input image using the method described above via the network, and the device including the decoding device 20 decodes the bit stream to obtain the decoded image. In this case, information transmitted through the network is an encoded (compressed) signal (bit stream), so that a channel capacity of the network can be reduced as compared with a case in which encoding is not performed.

The encoding device 10 may further include a code amount control unit (control unit) to control the code amount to be generated. The code amount control unit receives information about the generated code amount for each operation unit from the encoder 104, and controls the number of colors in the additional palette determined by the determination unit 101 based on whether the received code amount (or a value obtained by adding up the code amount in a predetermined period) exceeds a predetermined value. The control of the number of colors may be performed by the code amount control unit, for example, by changing the threshold Th in Expression (1) or (2) used for determining the additional palette by the determination unit 101. As the threshold Th increases, the number of colors in the additional palette tends to be reduced, so that the generated code amount can be reduced. In addition to the control described above, the code amount control unit may change a maximum value of the number of colors in the additional palette. Alternatively, when the indices are collectively encoded for a plurality of pixels (block) (for example, when the single index flag or the skip flag is used), control may be performed so that the indices are all the same in a block for which such a flag is designated. The code amount of the index can also be reduced through such control.

Second Embodiment

The following describes an image processing device according to a second embodiment focusing on a difference from the image processing device 1 according to the first embodiment. The first embodiment describes an operation of generating the palette for encoding the number of colors of which varies by integrating the reference palette including a fixed number of colors with the additional palette the number of colors of which varies, and assigning the index thereto. The present embodiment describes an operation of generating the palette for encoding including a predetermined number of colors. The entire configuration and the hardware configuration of the image processing device according to the present embodiment, and the configuration of the functional block of the encoding device 10 and the decoding device 20 are the same as those described in the first embodiment.

The palette generator 102 receives the additional palette and the reference palette from the determination unit 101 and the reference generator 105, respectively, and integrates the colors included in the additional palette and the reference palette to generate the palette for encoding. In the present embodiment, specifically, as illustrated in FIG. 13, the palette generator 102 generates a palette for encoding 635 including a predetermined number of colors (four in the example of FIG. 13) from a reference palette 615 including a predetermined number of colors (four in the example of FIG. 13) and an additional palette 625. In this case, the number of colors in the additional palette 625 varies depending on the operation unit. Assuming that the number of colors is k, and that the predetermined number of colors described above is N, the palette generator 102 generates the palette for encoding 635 from k colors in the additional palette 625 and (N−k) colors included in the reference palette 615. The reference palette 615 is a palette sorted in descending order of the number of times of reference by the reference generator 105, and a color at a higher rank in the sort result (that is, the number of times of reference is large in the previous operation unit) may also be included in the next operation unit with high possibility. The palette generator 102 extracts (N−k) colors at higher ranks in the sort result from the reference palette 615 including N colors, and causes the (N−k) colors to be included in the palette for encoding 635. The palette generator 102 arranges the additional palette 625 at the head, and arranges the (N−k) colors among the colors in the reference palette 615 subsequent thereto, to generate the palette for encoding 635. As a result, the number of colors in the palette for encoding 635 generated by the palette generator 102 is always a predetermined number of colors N.

The reference generator 105 receives the palette for encoding and the information about the number of times of reference from the palette generator 102 and the assignment unit 103, respectively, and generates the reference palette based on these pieces of information. In the first embodiment, after sorting the palette for encoding based on the number of times of reference, the reference generator 105 extracts the predetermined number of colors from the colors at higher ranks to generate the reference palette. In the present embodiment, the reference generator 105 is not required to extract the predetermined number of colors, and may generate the reference palette only by sorting the palette for encoding.

The palette generator 202 receives the additional palette and the reference palette from the decoder 201 and the reference generator 205, respectively, and generates the palette for decoding using the same method as the method of generating the palette for encoding performed by the palette generator 102 of the encoding device 10 according to the present embodiment.

The reference generator 205 receives the palette for decoding and the information about the number of times of reference from the palette generator 202 and the reference-times calculator, respectively, and generates the reference palette using the same method as the method of generating the reference palette performed by the reference generator 105 of the encoding device 10 according to the present embodiment.

As described above, in the present embodiment, the number of colors in the palette for encoding and the palette for decoding is always a predetermined number of colors unlike the palette for encoding the number of colors of which varies according to the first embodiment, so that the range of a value that can be taken by the index is reduced, which can reduce the code amount for encoding the index. Advantageously, a table for performing variable length encoding on the index is also reduced.

In the present embodiment, the palette for encoding generated by the palette generator 102 is constituted of the additional palette including k colors and the reference palette including (N−k) colors. Accordingly, as the number of colors in the additional palette is increased by one, the number of colors derived from the reference palette included in the palette for encoding is reduced by one. Thus, the determination unit 101 may determine the additional palette by generating the palette for encoding from a plurality of additional palette patterns considering the operation of the palette generator 102, calculating or estimating an encoding error (an error between the color of each pixel of the input image and the color assigned by the assignment unit 103 (for example, a sum of difference absolute values, a sum of difference square values, or the like)) and the generated code amount in a case in which the assignment unit 103 and the encoder 104 perform an assigning operation and an encoding operation for each of the additional palette patterns, and performing rate-distortion optimization for minimizing the cost (Cost) represented in Equation (3) based on the above values.

The determination unit 101 may generate the additional palette by setting the maximum value (kmax) of the number of colors in the additional palette from the number of colors in the operation unit, extracting only (N−kmax) colors at higher ranks in the sort result of the reference palette, and comparing the extracted colors with an input pixel.

Third Embodiment

The following describes an image processing device according to a third embodiment focusing on a difference from the image processing device 1 according to the first embodiment. In the first embodiment, the input image is basically encoded through raster scanning for each predetermined operation unit. In this case, the reference palette holds the color in the previous operation unit in order of raster scanning. On the other hand, information about a color in an adjacent operation unit in a preceding line may be lost in some cases. The present embodiment describes an operation of causing the color in a vertically adjacent operation unit to be referred to. The entire configuration and the hardware configuration of the image processing device according to the present embodiment are the same as those described in the first embodiment.

Figure 14:
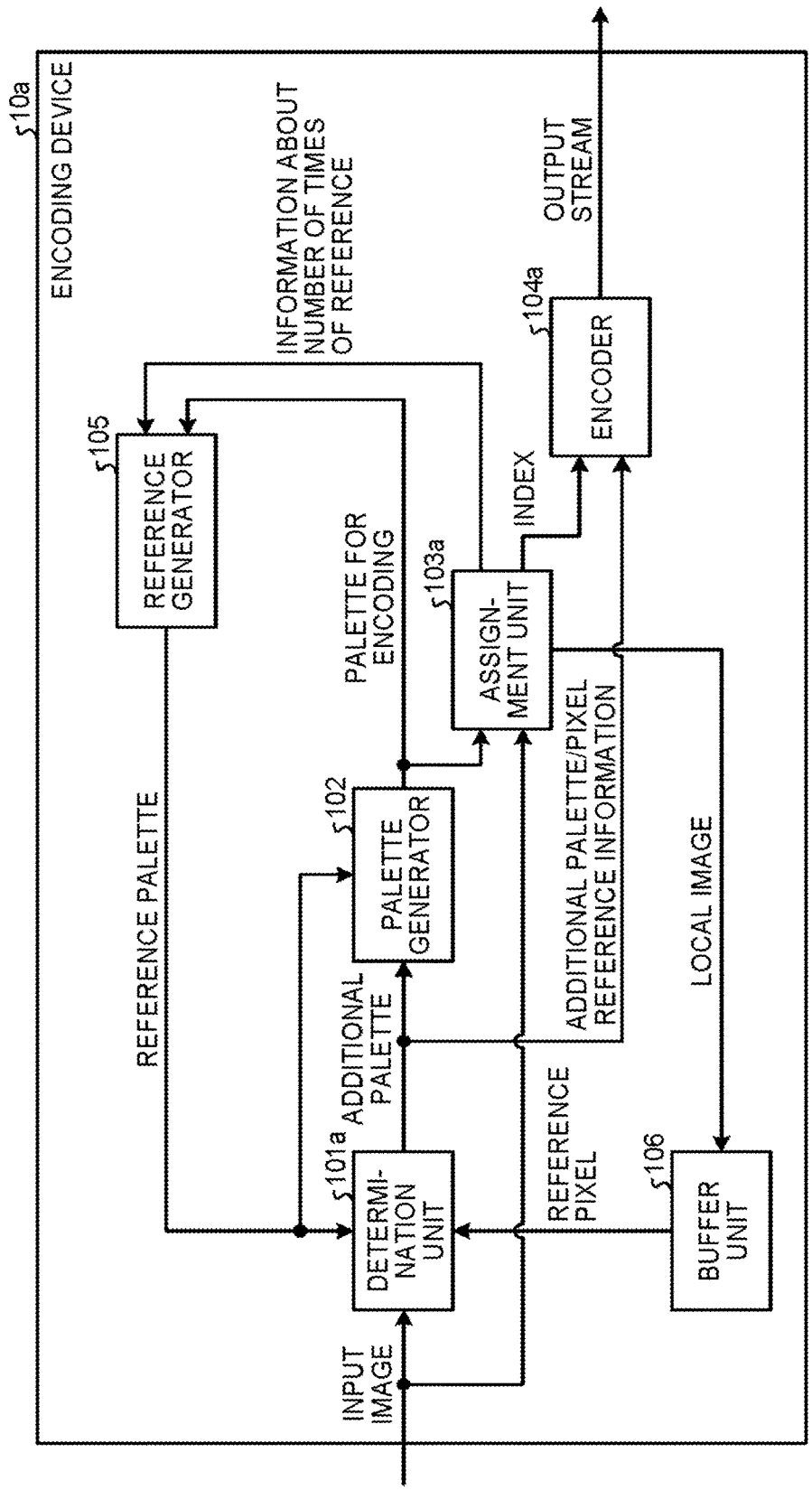
FIG. 14 is a diagram illustrating an example of a functional block of an encoding device according to a third embodiment.

FIG. 14 is a diagram illustrating an example of a functional block configuration of an encoding device according to the third embodiment. With reference to FIG. 14, the following describes a configuration and an operation of a functional block of an encoding device 10a of the image processing device according to the present embodiment.

As illustrated in FIG. 14, the encoding device 10a according to the third embodiment includes a determination unit 101a, the palette generator 102, an assignment unit 103a (first assignment unit), an encoder 104a, the reference generator 105, and a buffer unit 106 (storage). The operations of the palette generator 102 and the reference generator 105 are the same as those described in the first embodiment.

The determination unit 101a receives the input image (for example, the image stored in the auxiliary storage device 503 illustrated in FIG. 2, or the image received via the output I/F 505) from the outside, receives the reference palette from the reference generator 105, and determines the additional palette for each operation unit of the input image. The determination unit 101a further receives a reference pixel from the buffer unit 106, and determines whether there is a color, in the reference pixel, being the same as or similar to each color in the additional palette. If there is the same or a similar color, the determination unit 101a replaces the color in the additional palette with a corresponding color in the reference pixel. The reference pixel means one or more pixels in an operation unit adjacent to the operation unit as the encoding target. The reference pixel may be, for example, all or part of the pixels in the adjacent operation unit in the preceding line in order of raster scanning (for example, one pixel line adjacent to the operation unit as the encoding target).

The determination unit 101a further generates pixel reference information including a reference flag as information indicating whether each replaced color in the additional palette is derived from the reference pixel, and a reference index as information indicating the replaced color in the reference pixel. The determination unit 101a then transmits the replaced additional palette to the palette generator 102 and the encoder 104a, and transmits the pixel reference information to the encoder 104a. The determination unit 101a is implemented by the encoding processor 501 illustrated in FIG. 2.

The determination unit 101a may generate the additional palette and the pixel reference information using a method different from the method described above. Specifically, the determination unit 101a determines whether there is a color, in the reference palette or the reference pixel, being the same as or similar to a representative color of each group obtained by classifying the colors into the same or similar colors in the operation unit through Expression (1) or (2). If there is no same or similar color in the reference palette and the reference pixel, the representative color in the group is a color that is not derived from the reference pixel and to be added to the additional palette. If there is the same or a similar color in the reference pixel, the corresponding color in the reference pixel is a color that is derived from the reference pixel and to be added to the additional palette. In this case, as described above, information indicating the selected reference pixel is added to the pixel reference information. If there is the same or a similar color in the reference palette, the representative color is not added to the additional palette. If there is the same or a similar color in both of the reference pixel and the reference palette, for example, a value (error value) obtained with the left side of Expression (1) or (2) is calculated, and priority may be given to a smaller value. Alternatively, considering the generated code amount in the encoder 104a (described later), cost values each obtained by adding or multiplying a predetermined value to/by the error value are compared with each other, and priority may be given to a smaller value.

The assignment unit 103a receives the input image from the outside, receives the palette for encoding from the palette generator 102, assigns, as the index, the number indicating the corresponding color in the palette for encoding (the number given by the palette generator 102) to each pixel in the operation unit for each operation unit of the input image, and calculates the number of times of reference indicating the number of times when the color is referred to as the closest color in the palette for encoding in the operation unit (the number of pixels having a color closest to the color of interest in the operation unit). The assignment unit 103a assigns the color in the palette for encoding indicated by the index to each pixel (or part thereof) in the operation unit to generate a local image.

The assignment unit 103a transmits the index assigned to each pixel in the operation unit to the encoder 104a, transmits the information about the number of times of reference indicating the calculated number of times of reference to the reference generator 105, and causes the buffer unit 106 to store therein the generated local image. The assignment unit 103a is implemented by the encoding processor 501 illustrated in FIG. 2.

The encoder 104a receives the additional palette and the pixel reference information from the determination unit 101a, receives the index from the assignment unit 103a, and encodes the index and the information on the additional palette to generate the output stream. The encoder 104a then outputs the generated output stream to the outside (for example, the storage device 30 illustrated in FIG. 1). The encoder 104a is implemented by the encoding processor 501 illustrated in FIG. 2.

In the present embodiment, part of the colors in the additional palette is derived from the reference pixel. Thus, regarding the colors derived from the reference pixel in the additional palette, the encoder 104a encodes the reference flag and the reference index included in the pixel reference information instead of encoding the color information thereof. Specifically, the encoder 104a first encodes the number of colors in the additional palette. Thereafter, the encoder 104a encodes the reference flag for each color in the additional palette. If the reference flag is "1", the encoder 104a encodes the reference index corresponding to the reference flag. If the reference flag is "0", the encoder 104a encodes information (color information) indicating the color corresponding to the reference flag similarly to the encoder 104 according to the first embodiment.

The encoder 104a encodes the index assigned to each pixel in the operation unit by the assignment unit 103a using the same method as that used by the encoder 104 according to the first embodiment.

The buffer unit 106 is a functional unit that receives and stores therein the local image from the assignment unit 103a. The buffer unit 106 stores therein the local image for a predetermined period (for example, a period during which one line of the operation unit is processed), and the determination unit 101a reads out the local image (or part thereof) as the reference pixel.

In the present embodiment, the reference pixel is assumed to be all or part of the pixels in the adjacent operation unit. However, the reference pixel is not limited thereto. The same or a similar color may be included in the reference pixel. Thus, the pixel output from the buffer unit 106 may be converted by a reference pixel generator (not illustrated) to generate the reference pixel to be transmitted to the determination unit 101a. The reference pixel generator generates the reference pixel by collecting pixels having the same or similar colors. Accordingly, the number of reference pixels is reduced, so that the code amount for encoding the reference index by the encoder 104a can be reduced.

In the above description, encoding is performed in order of raster scanning for each operation unit. However, the same processing may be performed even in a case in which encoding is performed in order of scanning other than the order of raster scanning (for example, zigzag scanning, Z-scanning, or the like). In this case, the reference palette holds color information in a preceding operation unit, so that a pixel (or part thereof) in an adjacent operation unit different from the former operation unit may be utilized as the reference pixel. Also in such a case, the code amount for encoding the additional palette can be reduced.

The determination unit 101a, the palette generator 102, the assignment unit 103a, the encoder 104a, the reference generator 105, and the buffer unit 106 illustrated in FIG. 14 are merely conceptual functions, and are not limited to such a configuration. For example, a plurality of functional units illustrated as independent functional units in FIG. 14 may be configured as one functional unit. Alternatively, the function of one functional unit in FIG. 14 may be divided into a plurality of functions, and may be configured as a plurality of functional units.

The determination unit 101a, the palette generator 102, the assignment unit 103a, the encoder 104a, and the reference generator 105 illustrated in FIG. 14 are all implemented by the encoding processor 501 illustrated in FIG. 2. However, the embodiment is not limited thereto. That is, at least one of the functional units may be implemented when a central processing unit (CPU) executes a computer program stored in a storage medium such as a storage device (for example, the auxiliary storage device 503 illustrated in FIG. 2).

Figure 15:
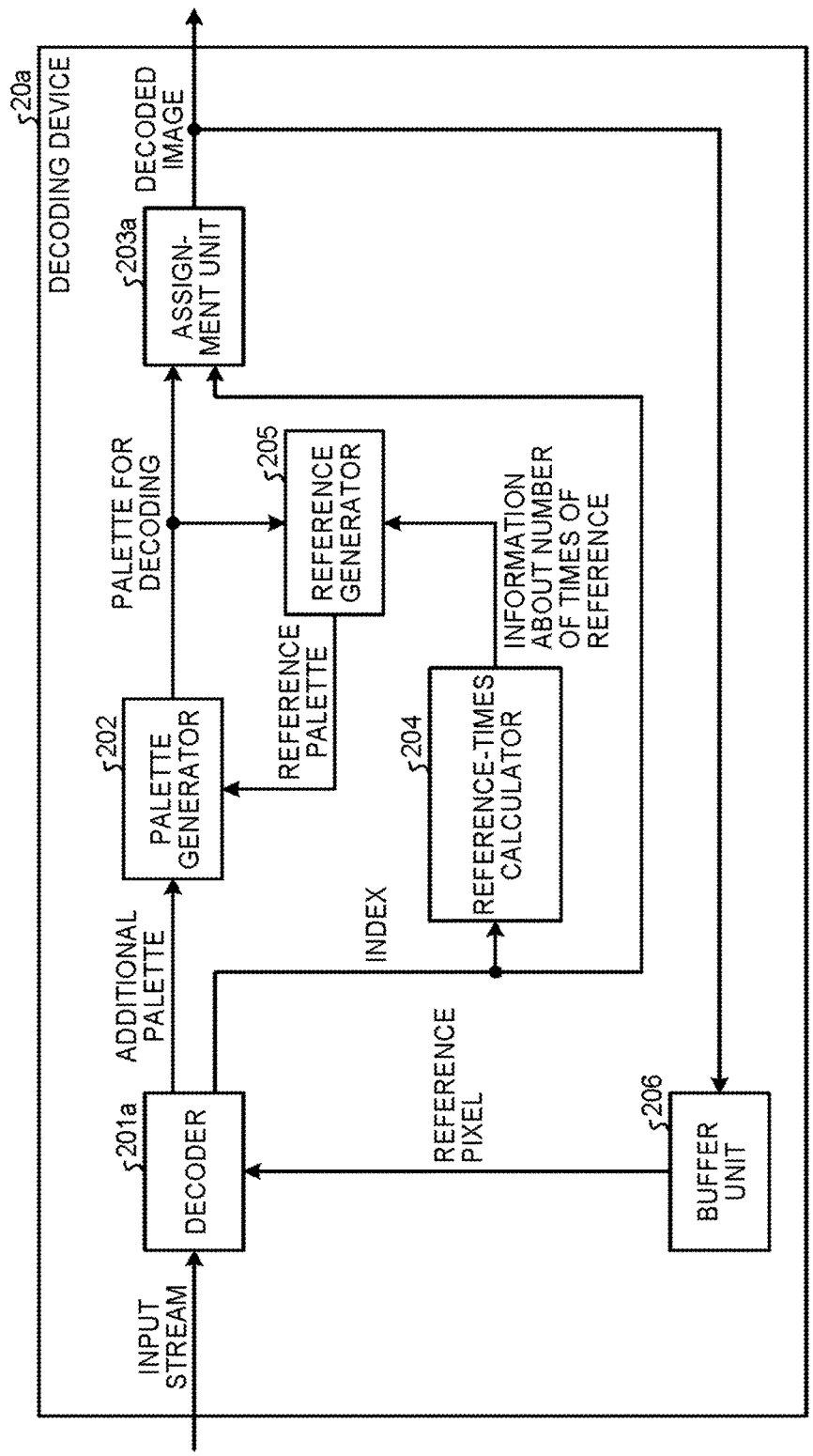
FIG. 15 is a diagram illustrating an example of a functional block of a decoding device according to the third embodiment.

FIG. 15 is a diagram illustrating an example of a functional block configuration of a decoding device according to the third embodiment. With reference to FIG. 15, the following describes a configuration and an operation of a functional block of a decoding device 20a of the image processing device according to the present embodiment.

As illustrated in FIG. 15, the decoding device 20a according to the third embodiment includes a decoder 201a, the palette generator 202, an assignment unit 203a (second assignment unit), the reference-times calculator, the reference generator 205, and a buffer unit 206. The operations of the palette generator 202, the reference-times calculator, and the reference generator 205 are the same as those described in the first embodiment.

The decoder 201a receives the bit stream (input stream) (for example, the bit stream stored in the RAM 504 illustrated in FIG. 2) from the outside, and decodes the input stream into the additional palette and the index. The decoder 201a further receives the reference pixel from the buffer unit 206. In decoding the additional palette, the decoder 201a first decodes the reference flag. If the reference flag is "1", the decoder 201a decodes the reference index. In this case, the decoder 201a adds the color of the reference pixel indicated by the reference index to the additional palette. If the reference flag is "0", similarly to the first embodiment, the decoder 201a decodes the information (color information) indicating the color in the additional palette.

The decoder 201a then transmits the decoded additional palette to the palette generator 202, and transmits the decoded index to the assignment unit 203a and the reference-times calculator. The decoder 201a is implemented by the decoding processor 502 illustrated in FIG. 2.

The assignment unit 203a receives the index and the palette for decoding from the decoder 201a and the palette generator 202, respectively, and assigns the color in the palette for decoding corresponding to the index to each pixel in the operation unit to generate the decoded image. The assignment unit 203a outputs the generated decoded image to the outside (for example, the display device 2 illustrated in FIG. 2) and the buffer unit 206. The assignment unit 203a is implemented by the decoding processor 502 illustrated in FIG. 2.

The buffer unit 206 is a functional unit that receives and stores therein the decoded image from the assignment unit 203a. The buffer unit 206 stores therein the decoded image for a predetermined period (for example, a period during which one line of the operation unit is processed), and the decoder 201a reads out the decoded image (or part thereof) as the reference pixel.

When the encoding device 10a is assumed to include the reference pixel generator, the configuration and the operation of the decoding device 20a may be modified correspondingly. Specifically, the pixel output from the buffer unit 206 may be converted by the reference pixel generator (not illustrated) using the same method as that used by the encoding device 10a, to generate the reference pixel and to be transmitted to the decoder 201a.

When the encoder 104a directly encodes the color in the additional palette, for example, when the encoder 104a encodes a value of each of components R, G, and B by 8 bits, a code amount of 24 bits is required for one color. On the other hand, when the reference index is encoded as described in the present embodiment, in a case in which the number of reference pixels is four, for example, the code amount of the reference index is merely 2 bits. As described above, the reference palette holds the color information in the previous operation unit in order of encoding. However, the color information in an adjacent operation unit in a preceding line may be lost in some cases. In the first embodiment, when such a color appears in the operation unit as the encoding target, the color is encoded as the additional palette. According to the present embodiment, the color in an adjacent operation unit in a preceding line is utilized as the reference pixel, so that the code amount of the additional palette can be reduced, which can improve encoding efficiency of the encoding device 10a.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encoding device comprising:
a memory; and
one or more encoding processors configured to function as a determination unit, a first palette generator, a first assignment unit, an encoder, and a first reference generator,
the determination unit determines an additional palette that holds a color not included in a first reference palette among colors included in a predetermined operation unit of an input image;
the first palette generator generates an encoding palette including a color included in the additional palette and a color included in the first reference palette;
the first assignment unit assigns, to each pixel in the operation unit, an index indicating a color in the encoding palette corresponding to a color of the pixel;
the encoder encodes the index and information on the additional palette; and
the first reference generator generates the first reference palette from the encoding palette, wherein
the first assignment unit calculates the number of times when the color in the encoding palette is referred to as a color corresponding to the color of each pixel in the operation unit, and
the first reference generator extracts a predetermined number of colors in descending order of the number of times of reference from among colors in the encoding palette to generate the first reference palette.

2. The device according to claim 1, wherein the encoder encodes the index corresponding to the color in the additional palette among colors in the encoding palette with a code shorter than a code corresponding to the index corresponding to the color in the first reference palette among the colors in the encoding palette.

3. The device according to claim 1, wherein
the encoder encodes the index corresponding to each pixel in the operation unit, and
when a color corresponding to the index is a color in the additional palette and information on the color in the additional palette is not encoded, the encoder encodes the information.

4. A decoding device comprising:
a memory; and
one or more decoding processors configured to function as a decoder, a second palette generator, a second assignment unit, and a second reference generator, wherein
the decoder decodes the index and the information on the additional palette encoded by the encoding device according to claim 1;
the second palette generator generates a decoding palette including a color in the additional palette decoded by the decoder and a color included in a second reference palette;
the second assignment unit assigns a color in the decoding palette corresponding to the index decoded by the decoder to each pixel in a predetermined operation unit; and
the second reference generator generates the second reference palette from the decoding palette.

5. An encoding device comprising:
a memory; and
one or more encoding processors configured to function as a determination unit, a first palette generator, a first assignment unit, an encoder, and a first reference generator,
the determination unit determines an additional palette that holds a color not included in a first reference palette among colors included in a predetermined operation unit of an input image;
the first palette generator generates an encoding palette including a color included in the additional palette and a color included in the first reference palette;
the first assignment unit assigns, to each pixel in the operation unit, an index indicating a color in the encoding palette corresponding to a color of the pixel;
the encoder encodes the index and information on the additional palette; and
the first reference generator generates the first reference palette from the encoding palette, wherein
the first assignment unit calculates the number of times when the color in the encoding palette is referred to as a color corresponding to the color of each pixel in the operation unit, and
when the index corresponding to a color in the first reference palette among colors in the encoding palette is encoded, the encoder encodes the index with a shorter code as the number of times of reference of the color corresponding to the index increases.

6. An encoding device comprising:
a memory; and
one or more encoding processors configured to function as a determination unit, a first palette generator, a first assignment unit, an encoder, and a first reference generator,
the determination unit determines an additional palette that holds a color not included in a first reference palette among colors included in a predetermined operation unit of an input image;
the first palette generator generates an encoding palette including a color included in the additional palette and a color included in the first reference palette;
the first assignment unit assigns, to each pixel in the operation unit, an index indicating a color in the encoding palette corresponding to a color of the pixel;
the encoder encodes the index and information on the additional palette; and
the first reference generator generates the first reference palette from the encoding palette, wherein
the first assignment unit generates a local image by assigning the color in the encoding palette indicated by the index to each pixel in the operation unit,
the device further comprises a storage configured to store therein the local image,
when there is a color same or similar to a color of a reference pixel adjacent to the operation unit as a pixel of the local image stored in the storage among colors in the additional palette, the determination unit replaces the color in the additional palette with a corresponding color of the reference pixel, and
when information on the additional palette is encoded, the encoder encodes information on the reference pixel for a color corresponding to the reference pixel among the colors in the additional palette.

7. An encoding device comprising:
a memory; and
one or more encoding processors configured to function as a determination unit, a first palette generator, a first assignment unit, an encoder, and a first reference generator,
the determination unit determines an additional palette that holds a color not included in a first reference palette among colors included in a predetermined
operation unit of an input image;

the first palette generator generates an encoding palette
including a color included in the additional palette and
a color included in the first reference palette;

the first assignment unit assigns, to each pixel in the
operation unit, an index indicating a color in the
encoding palette corresponding to a color of the pixel;

the encoder encodes the index and information on the
additional palette; and the first reference generator generates the first reference
palette from the encoding palette, wherein the first assignment unit calculates the number of times
when the color in the encoding palette is referred to as
a color corresponding to the color of each pixel in the
operation unit, the first reference generator generates the first reference
palette including the same number of colors as number
of colors in the encoding palette based on the encoding
palette, and the first palette generator generates the encoding palette
including colors in the additional palette and colors
obtained by excluding number of colors in the additional palette from colors in the first reference palette in
ascending order of the number of times of reference.

8. An encoding device comprising:
a memory; and
one or more encoding processors configured to function
as a determination unit, a first palette generator, a first
assignment unit, an encoder, and a first reference generator,
the determination unit determines an additional palette
that holds a color not included in a first reference
palette among colors included in a predetermined
operation unit of an input image;
the first palette generator generates an encoding palette
including a color included in the additional palette and
a color included in the first reference palette;
the first assignment unit assigns, to each pixel in the
operation unit, an index indicating a color in the
encoding palette corresponding to a color of the pixel;
the encoder encodes the index and information on the
additional palette; and
the first reference generator generates the first reference
palette from the encoding palette, wherein
when a difference between a value of a component of a
color included in the operation unit and a value of a
component of a color included in the first reference
palette is determined to be larger than a threshold, the
determination unit determines that the color included in
the operation unit is not included in the first reference
palette, and the device further comprises a controller configured to
control the number of colors in the additional palette by
changing the threshold.

9. An image processing device comprising:
an encoding device including a memory, and one or more
encoding processors configured to function as a determination unit, a first palette generator, a first assignment unit, an encoder, and a first reference generator,
the determination unit determines an additional palette
that holds a color not included in a first reference
palette among colors included in a predetermined
operation unit of an input image,
the first palette generator generates an encoding palette
including a color included in the additional palette
and a color included in the first reference palette,
the first assignment unit assigns, to each pixel in the
operation unit, an index indicating a color in the
encoding palette corresponding to a color of the
pixel,
the encoder encodes the index and information on the
additional palette, and
the first reference generator generates the first reference
palette from the encoding palette, wherein
the first assignment unit calculates the number of times
when the color in the encoding palette is referred to as
a color corresponding to the color of each pixel in the
operation unit, and
the first reference generator extracts a predetermined
number of colors in descending order of the number of
times of reference from among colors in the encoding
palette to generate the first reference palette, and
a decoding device including a memory, and one or more
decoding processors configured to function as a
decoder, a second palette generator, a second assignment unit, a second reference generator,
the decoder decodes the index and the information on
the additional palette encoded by the encoding
device,
the second palette generator generates a decoding palette including a color in the additional palette
decoded by the decoder and a color included in a
second reference palette,
the second assignment unit assigns a color in the
decoding palette corresponding to the index decoded
by the decoder to each pixel in a predetermined
operation unit, and
the second reference generator generates the second
reference palette from the decoding palette.

* * * * *